US009749552B2

(12) United States Patent
Gopinath et al.

(10) Patent No.: US 9,749,552 B2
(45) Date of Patent: Aug. 29, 2017

(54) AUTOMATIC IDENTIFICATION AND MAPPING OF CONSUMER ELECTRONIC DEVICES TO PORTS ON AN HDMI SWITCH

(71) Applicant: Caavo Inc, Santa Clara, CA (US)

(72) Inventors: Vinod Gopinath, Bangalore (IN); Sharath Hariharpur Satheesh, Bangalore (IN); Neha Mittal, New Delhi (IN); Siddharth Kumar, Bangalore (IN); Bitto Niclavose, Kottayam (IN); Ashish Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 14/945,125

(22) Filed: Nov. 18, 2015

(65) Prior Publication Data
US 2016/0142647 A1    May 19, 2016

Related U.S. Application Data

(60) Provisional application No. 62/081,414, filed on Nov. 18, 2014.

(51) Int. Cl.
*H04N 5/268* (2006.01)
*H04N 5/44* (2011.01)
(Continued)

(52) U.S. Cl.
CPC ....... *H04N 5/268* (2013.01); *G06F 17/30784* (2013.01); *G06K 9/00744* (2013.01);
(Continued)

(58) Field of Classification Search
USPC ................................ 348/706, 705
See application file for complete search history.

(56) References Cited

U.S. PATENT DOCUMENTS 8,019,999 B2 * 9/2011 Candelore ........ H04N 21/43632
713/151
8,666,152 B1  3/2014 Ramanathan et al.
(Continued)

FOREIGN PATENT DOCUMENTS

EP      2385517 A1    11/2011
WO   2013/045467 A1    4/2013
WO   2016/081624 A1    5/2016

OTHER PUBLICATIONS

International Search Report and Written Opinion received for PCT Patent Application No. PCT/US2015/061379, mailed an Mar. 10, 2016, 10 pages.
(Continued)

*Primary Examiner* — Paulos M Natnael
(74) *Attorney, Agent, or Firm* — Fiala & Weaver P.L.L.C.

(57) ABSTRACT

Methods, systems, and apparatuses are described for automatic identification and mapping of consumer electronic devices to ports on an HDMI switch. A device that is connected to an HDMI switch is identified based on data received over an HDMI connection, and ports on the HDMI switch are automatically mapped and configured. Methods, systems, and apparatuses are described for back-end database creation for automatic identification and mapping of consumer electronic devices to ports on an HDMI switch. The back-end database may be created by the based on video and audio signatures received from a consumer electronic device and based on remote control information and signatures.

14 Claims, 13 Drawing Sheets

(51) Int. Cl.
    *H04N 21/4363*     (2011.01)
    *G06K 9/00*     (2006.01)
    *G06K 9/18*     (2006.01)
    *H04N 5/765*     (2006.01)
    *H04N 21/436*     (2011.01)
    *H04N 21/442*     (2011.01)
    *G06F 17/30*     (2006.01)

(52) U.S. Cl.
    CPC ........... *G06K 9/00758* (2013.01); *G06K 9/18* (2013.01); *H04N 5/4401* (2013.01); *H04N 5/765* (2013.01); *H04N 21/43615* (2013.01); *H04N 21/43635* (2013.01); *H04N 21/44227* (2013.01); *G06K 2209/01* (2013.01)

(56) References Cited

U.S. PATENT DOCUMENTS

| | | | | |
|---|---|---|---|---|
| 9,319,616 | B2* | 4/2016 | Chang | H04N 5/4403 |
| 2007/0153132 | A1* | 7/2007 | Jong | H04N 5/775 |
| | | | | 348/705 |
| 2007/0220150 | A1* | 9/2007 | Garg | G09G 5/006 |
| | | | | 709/226 |
| 2011/0041154 | A1* | 2/2011 | Olson | G06F 17/30787 |
| | | | | 725/54 |
| 2011/0157467 | A1 | 6/2011 | McRae | |
| 2011/0161660 | A1* | 6/2011 | Zhang | H04L 63/061 |
| | | | | 713/156 |
| 2011/0300929 | A1* | 12/2011 | Tardif | A63F 13/63 |
| | | | | 463/30 |
| 2011/0317076 | A1* | 12/2011 | Chen | H04N 21/436 |
| | | | | 348/705 |
| 2012/0020647 | A1* | 1/2012 | Vogel | H04N 5/765 |
| | | | | 386/251 |
| 2014/0122059 | A1* | 5/2014 | Patel | G06F 17/30017 |
| | | | | 704/9 |
| 2014/0270696 | A1* | 9/2014 | Banks | H04N 9/87 |
| | | | | 386/231 |
| 2014/0347565 | A1* | 11/2014 | Fullam | H04N 5/607 |
| | | | | 348/738 |
| 2016/0044273 | A1* | 2/2016 | Thompson | H04N 5/268 |
| | | | | 348/569 |
| 2016/0140075 | A1* | 5/2016 | Kashyap | G06F 13/4265 |
| | | | | 710/104 |

OTHER PUBLICATIONS

International Preliminary Report on Patentability received for PCT Patent Application No. PCT/US2015/061379, mailed Jun. 1, 2017, 7 pages.

* cited by examiner

Generate at least one signature of the electronic device that comprises a video signature — 602

FIG. 6      600

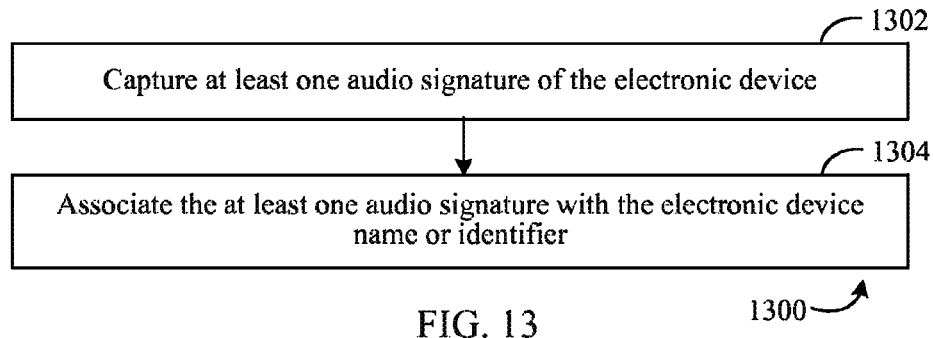
FIG. 13
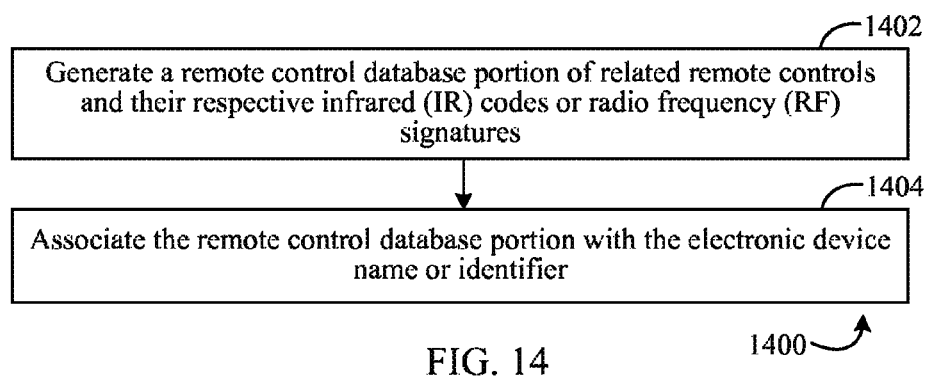
FIG. 14
| Mapping - Table 1 | | |
|---|---|---|
| Port | Device ID | Device type |
| 1 (In) | Bluray-ABC123 | Source |
| 2 (N/A) | | |
| 3 (N/A) | | |
| 4 (Out) | TV-XYZ227 | Sink |
| ⋮ | | |
FIG. 15

AUTOMATIC IDENTIFICATION AND MAPPING OF CONSUMER ELECTRONIC DEVICES TO PORTS ON AN HDMI SWITCH

CROSS-REFERENCE TO RELATED APPLICATIONS

The present application claims priority to U.S. Application Ser. No. 62/081,414, entitled "AUTOMATIC IDENTIFICATION AND MAPPING OF CONSUMER ELECTRONIC DEVICES TO PORTS ON AN HDMI SWITCH," filed on Nov. 18, 2014, the entirety of which is incorporated by reference herein.

This application is related to U.S. patent application Ser. No. 14/945,175, entitled "SEAMLESS SETUP AND CONTROL FOR HOME ENTERTAINMENT DEVICES AND CONTENT," filed on even date herewith, the entirety of which is incorporated by reference herein.

This application is related to U.S. patent application Ser. No. 14/945,079, entitled "AUTO DETECTION AND ADAPTIVE CONFIGURATION OF HDMI PORTS," filed on even date herewith, the entirety of which is incorporated by reference herein.

BACKGROUND

Technical Field

The present invention relates to methods, systems, and apparatuses for automatic identification and mapping of consumer electronic devices to ports on an HDMI switch.

Background Art

A typical household has about 3 or 4 audio/video (A/V) devices connected to a television (TV) or high definition TV (HDTV). These devices typically include a cable/satellite TV set top box (STB), an audio system, a Blu-ray® or DVD (digital versatile disc) player, a digital media adapter, a game console, and so on.

Most of these devices now come with a high-speed high-definition media interface (HDMI) to allow transfer of high resolution video and audio from the source device (Blu-ray® player, cable TV set top box, etc.) to the sink device (typically the television). By its very nature this is a many-to-one configuration (many sources connected to a sink).

In order to manage multiple devices an HDMI repeater/switch is used between the sink and the many sources that allows a user to switch amongst the sources without having to physically swap out cables every time. A typical HDMI switch configuration 100A is shown in FIG. 1A. A sink device such as TV 102 is connected to an HDMI switch 104 over an HDMI connection 112. One or more source devices are also connected to HDMI switch 104. For example a STB 106 is connected via an HDMI connection 114, a game console 108 is connected via an HDMI connection 116, and a Blu-ray® player 110 is connected via an HDMI connection 118.

Many televisions have also started incorporating switch functionality. Multiple HDMI sources are connected directly to the television that then acts as a switch. However many televisions have a limited number of inputs for source devices, and an additional external switch is required to manage the source devices. Moreover, televisions lack the ability to connect to an external, surround speaker system which makes an HDMI repeater (e.g., an audio/video repeater (AVR)) another candidate to be placed in between HDMI sources and an HDMI sink.

To add to the confusion, a typical HDMI switch has ports that have a fixed configuration as inputs or outputs. It is therefore required that HDMI sources are connected to inputs of the HDMI switch and the HDMI sink(s) to the output(s) of the HDMI switch. Once plugged in, it becomes difficult to remember which device was connected to which port. For example, FIG. 1B shows a switch configuration 100B that is a variation of switch configuration 100A. In FIG. 1B, STB 106 has become the active source device, which is the device selected by HDMI switch 104 to supply media content to TV 102. Accordingly, HDMI switch 104 switches to input port 1 for STB 106, thereby making STB 106 an active device 120 that supplies media content over HDMI connection 114 in switch configuration 100B. Similarly, FIG. 1C shows a switch configuration 100C that is a variation of switch configurations 100A and 100B with a change for HDMI switch 104 from input port 1 to input port 2 for game console 108. That is, game console 108 has become an active device 122 enabled to supply media content to TV 102 over HDMI connection 116 in switch configuration 100B. However, for a user to change to port 1 of HDMI switch 104, or to port 2 of HDMI switch 104, the user must remember which device is connected to which port.

Additionally, given that switching ports takes time due to the inherent latencies associated with syncing the newly selected source input (e.g., due to potentially different A/V characteristics, content protection checks, etc.) to the sink, the user may shuffle a few times amongst the various ports before being able to fix on the right port.

Each of these issues decreases the overall enjoyment and satisfaction associated with the end user experience.

BRIEF SUMMARY

Methods, systems, and apparatuses are described for automatic identification and mapping of consumer electronic devices to ports on an HDMI switch, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 6 is a flowchart of a method for creating a device signature, according to an exemplary embodiment.

FIG. 13 is a flowchart of a method for creating a device signature by audio segments, according to an exemplary embodiment.

FIG. 14 is a flowchart of a method for creating a device signature by remote control, according to an exemplary embodiment.

FIG. 15 is a table showing device to port mapping, according to an exemplary embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1A:
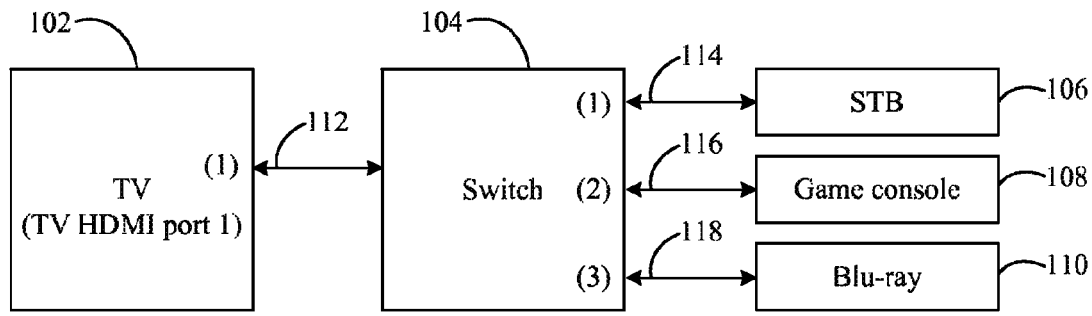
FIG. 1A is a block diagram of a typical HDMI switch configuration.
Figure 1B:
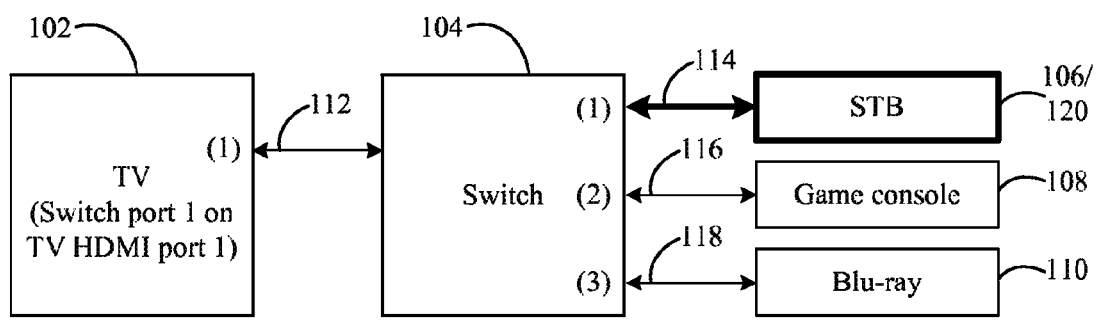
FIGS. 1B-1C are block diagrams showing a port change for an HDMI switch in the typical HDMI switch configuration of FIG. 1A.
Figure 1C:
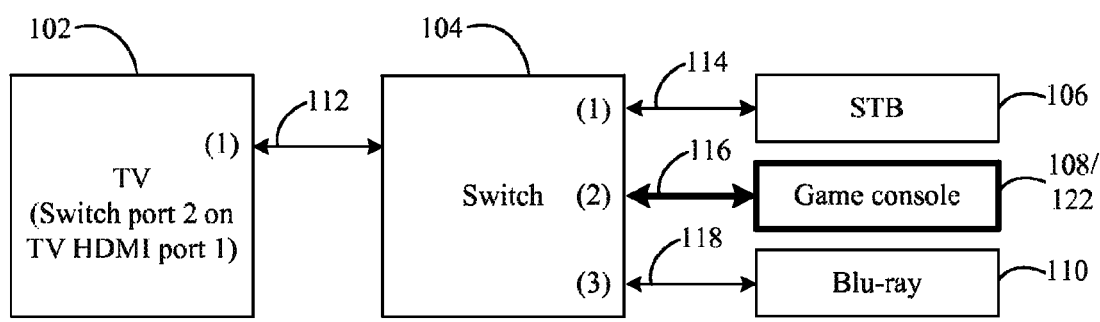

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are now described. Any section/subsection headings provided herein are not intended to be limiting. Embodiments are described throughout this document, and each embodiment may be eligible for inclusion within multiple different sections or subsections. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

In embodiments, techniques for automatic identification and mapping of consumer electronic devices to ports on an HDMI switch are described. Embodiments described herein alleviate and/or eliminate the above-noted problems by making detection and mapping of electronic devices more flexible, convenient, and "user friendly." For instance, the described techniques and embodiments include HDMI connectors/ports that are not pre-designated or pre-defined for any specific input or output thus eliminating the need for dedicated input or output ports in HDMI switches and repeaters, and reducing the complexity and enhancing the ease of device setup. The example techniques and embodiments described herein may be adapted to various types of systems and devices, such as HDMI switches and repeaters or other types of electronic devices. By way of example but without limitation, the embodiments herein may also be adapted to communication devices (e.g., cellular and smart phones, etc.), computers/computing devices (laptops, tablets, desktops, etc.), computing systems, other electronic devices such as gaming consoles, TVs, HDTVs, other home electronics and entertainment devices, HDMI repeaters, and/or the like, that may include HDMI input/output ports into which HDMI devices are connected. While embodiments may be described in the context of HDMI switches herein, it is contemplated that embodiments may be implemented according to the various types of systems and devices noted above. It is contemplated herein that in various embodiments and with respect to the illustrated figures of this disclosure, one or more components described and/or shown may not be included and that additional components may be included.

As noted above, a user's enjoyment and experience, e.g., for home theater, may be lessened by complexities in, and time consumed for, device identification and setup of proper HDMI connections between HDMI sources and sinks. The described techniques and embodiments include an identification scheme in which an HDMI switch or repeater is able to identify an HDMI device connected to a HDMI port/connection of a repeater or switch, and automatically map and configure the device to the HDMI port/connection. According to embodiments, techniques are provided to alleviate or eliminate the problems above in different ways. Such techniques include, without limitation, a universal input/output HDMI port, auto HDMI port mapping to connected devices, and auto HDMI port switching to connected devices. For instance, according to the described embodiments and techniques, a user is no longer required to connect a device to a specific HDMI port of a switch, or to remember the HDMI port number for the device—rather, the device may be automatically identified and mapped using just the name of the connected device. In some embodiments, even the name of the device is not required if the user desires to watch specific content and is not particular about the source device.

A switch or HDMI switch, according to disclosed embodiments, is configured to automatically identify (e.g., determine) an electronic device coupled to each HDMI port/connector thereof. An identified device is mapped to its associated port/connector by the switch, and the switch configures the port/connector as an input or an output according to the device identification. For example, for each electronic device coupled to a particular connector/port, a switch is configured to determine one or more identifiers of the electronic device, such as, but not limited to, a type of the electronic device (e.g., a DVD player, a Blu-ray® player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), source product description (SPD), and extended display identification data (EDID), identification by different types of video data, identification by audio data, identification by IP (Internet protocol) network, identification by remote control operation by a user, identification by voice input from a user, and identification by explicit device selection by a user. Upon determining the identifier(s), the switch is configured to map the identified electronic device to the connector/port to which that electronic device is connected. This process may be referred to as "device-to-port mapping." The switch is also operable to (capable to) automatically configure the connector/port to which the electronic device is connected as an input or output based on the identified electronic device.

By way of example and not limitation, an example scenario is described in which a user desires to watch a particular movie, although other forms of multimedia content are also contemplated. According to embodiments, the user searches for the title or content of the movie, and selects the movie from the search results. The user is then presented with an option to play the movie from one or more sources (e.g., a STB, Netflix®, Hulu®, iTunes®, etc. The user may select, for example, the source Netflix®, prompting the movie to be played from Netflix® via Roku® (i.e., via the appropriate connector/port of the switch) on the TV of the user. Thus, according to embodiments, the user selects a movie for viewing without being required to identify or map the device on which the user will watch the movie.

The embodiments described herein attempt to remove the confusion and complexities noted above, and make it simple for a consumer/user to switch to an intended source device without having to remember the HDMI port number of a switch or repeater to which the intended source device is tethered.

Accordingly, the techniques and embodiments described herein provide for improvements in automatic identification and mapping of consumer electronic devices to ports on an HDMI switch, as described above. For instance, methods, systems, devices, and apparatuses are provided for automatic identification and mapping of consumer electronic devices to ports on an HDMI switch.

A method for generating a database of signatures for automatic identification and mapping of an electronic device to a port on a high-definition media interface (HDMI) switch in accordance with an example aspect is described. The method includes generating at least one signature of the electronic device, and determining an identification of the electronic device as an HDMI source or an HDMI sink. The method also includes associating at least the signature and the identification with an electronic device name or identifier that corresponds to the electronic device in the database.

In the method, the at least one signature includes a video signature, and generating the at least one signature includes generating the video signature to include a digital video fingerprint.

The method also includes generating the digital video fingerprint by performing at least one of: capturing a logo displayed on a display that identifies the electronic device during a boot up of the electronic device, capturing a logo displayed on a display that identifies the electronic device during normal operation of the electronic device, capturing a template of pixels displayed on a display, or capturing one or more of text, images, blocks of text, and blocks of images displayed on a display that identifies the electronic device.

In the method, the logo includes video data, and the digital video fingerprint includes a perceptual-hash (p-Hash) that is generated by converting the video data to a gray scale format to generate gray scale video data, scaling down a resolution of the gray scale video data, applying a discrete cosine transform (DCT) to the gray scale video data, extracting one or more data coefficients from the DCT, and generating a p-Hash value from a matrix of low-frequency energy coefficients from the one or more data coefficients.

In the method, the at least one signature includes a video signature. In the method, generating the at least one signature includes capturing a logo displayed on a display that identifies the electronic device during a boot up of the electronic device, capturing a logo displayed on a display that identifies the electronic device during normal operation of the electronic device, capturing video data includes a template of pixels displayed on a display, or capturing one or more of text, images, blocks of text, and blocks of images displayed on a display that identifies the electronic device.

In the method, capturing the logo that identifies the electronic device during a boot up, capturing the logo that identifies the electronic device during a normal operation, capturing images, and capturing blocks of images includes performing one or more of a scale-invariant feature transform (SIFT) process, a speeded-up robust features (SURF) process, features from accelerated segment test (FAST) process, and an oriented FAST rotated binary robust independent elementary features (BRIEF) (ORB) process. In the method, capturing video data comprising a template of pixels includes executing one or more of a square difference algorithm, a correlation algorithm, and a coefficient algorithm. In the method, capturing text and blocks of text includes capturing by optical character recognition (OCR).

In the method, the at least one signature includes an audio signature, and generating the at least one signature includes capturing at least one audio signature of the electronic device, and associating the at least one audio signature with the electronic device name or identifier.

In the method, the at least one signature comprises a remote control signature, and generating the at least one signature includes generating a remote control database portion of related remote controls and their respective infrared (IR) codes or radio frequency (RF) signatures, and associating the remote control database portion with the electronic device name or identifier.

A method for automatic identification and mapping of an electronic device to a port on a high-definition media interface (HDMI) switch in accordance with an example aspect is also described. The method includes receiving a signal from the electronic device by the HDMI switch, and determining whether the electronic device is an HDMI sink or an HDMI source based at least in part on the received signal. The method also includes performing at least one of: a) identifying the electronic device based on identification data in the signal in response to determining the electronic device is an HDMI sink, and mapping the electronic device to an output port of the HDMI switch based on the identifying the electronic device based on the identification data; or 2) receiving an audio/video stream from the electronic device, identifying the electronic device based on data in the audio/video stream, and mapping the electronic device to an input port of the HDMI switch based on the identifying the electronic device based on data in the audio/video stream.

In the method, identifying the electronic device based on HDMI protocol includes receiving an HDMI consumer electronics control (CEC) command response from the electronic device, and determining an identifier of the electronic device based on data in the HDMI CEC command response. In some embodiments, identifying the electronic device based on HDMI protocol includes receiving an HDMI source product description (SPD) information frames from the electronic device, and determining an identifier of the electronic device based on information in the HDMI SPD frame.

In the method, identifying the electronic device includes prompting, by the HDMI switch, a remote control key press, and determining, based on an action performed by the remote control, at least one of a) a device type of the electronic device as being at least one of a Wi-Fi device, a Bluetooth device, or a Radio Frequency for Consumer Electronics (RF4CE) device based on a remote control signature, or b) an infrared (IR) command of the remote control, and identifying the electronic device in a database based on at least one of the device type, the remote control signature, or the IR command.

In the method, identifying the electronic device based on data in the audio/video stream includes analyzing the received audio/video stream for at least one signature, comparing the at least one signature against one or more templates stored in a database, and identifying the electronic device in the database based on the comparing.

In the method, the signature is a video signature that includes at least one of a logo, text, an image, blocks of text, or blocks of images.

In the method, the signature is an audio signature, and analyzing the received audio/video stream includes prompting, by the HDMI switch, a remote control key press to generate the audio signature, and recording the at least one audio signature.

In the method, prompting, by the HDMI switch, a user data entry for a name of the electronic device and/or a designation of the electronic device as an HDMI source or an HDMI sink.

A system for automatic identification and mapping of an electronic device to a configurable port on a high-definition media interface (HDMI) switch in accordance with an example aspect is also described. The system includes at least one input/output port, at least one storage device, at least one processing component, an identification component, and a mapping component. The at least one input/output port is configured to transmit signals to and receive signals from at least one electronic device, and the at least one storage device is configured to store one or more device signatures or one or more remote control commands. The at least one processing component is configured to populate the storage device with the one or more device signatures or the one or more remote control commands. The identification component is configured to determine whether the electronic device is an HDMI sink or an HDMI source, and to determine an identity of an electronic device coupled to the system. The mapping component is configured to dynamically configure the at least one input/output port as an input port or an output port based at least in part on the identity, and to map the electronic device to the configured input port or the configured output port.

In the system, the electronic device is mapped to the configured input port, and the system further includes an activation component configured to receive a user input that includes information indicative of audio/video content selected by a user, and activate the configured input port based on the information.

In the system, the identification component is configured to determine the identity of the electronic device by comparing at least a portion of an audio/video signal received from the electronic device to the one or more device signatures, the one or more device signatures being at least one of a fingerprint signature, a template signature, a text signature, a logo signature, or an audio signature.

In the system, the identification component is configured to determine an identifier of the electronic device based on data in an HDMI consumer electronics control (CEC) command response received from the electronic device. In system embodiments, the identification component is configured to determine an identifier of the electronic device based on data in an HDMI source product description (SPD) information frame received from the electronic device.

In the system, the identification component is configured to determine the identity of the electronic device based on at least one of the one or more remote control commands, a prompted user input, or Internet protocol information.

Various example embodiments are described in the following subsections. In particular, example HDMI switch embodiments are described, followed by a description of integration embodiments. Subsequently, operational embodiments are provided, and then further example embodiments and advantages are described. Finally, some concluding remarks are provided. It is noted that the division of the following description generally into subsections is provided for ease of illustration, and it is to be understood that any type of embodiment may be described in any subsection.

III. Example HDMI Switch Embodiments

Systems and devices may be configured in various ways according to the embodiments and techniques described herein. In embodiments, an HDMI switch (or repeater or other device with HDMI connectors/ports) may be connected to one or more HDMI enabled devices. The HDMI switch or other device may be configured, according to embodiments, to automatically identify and map connected devices to universal connectors/ports of the switch.

Figure 2:
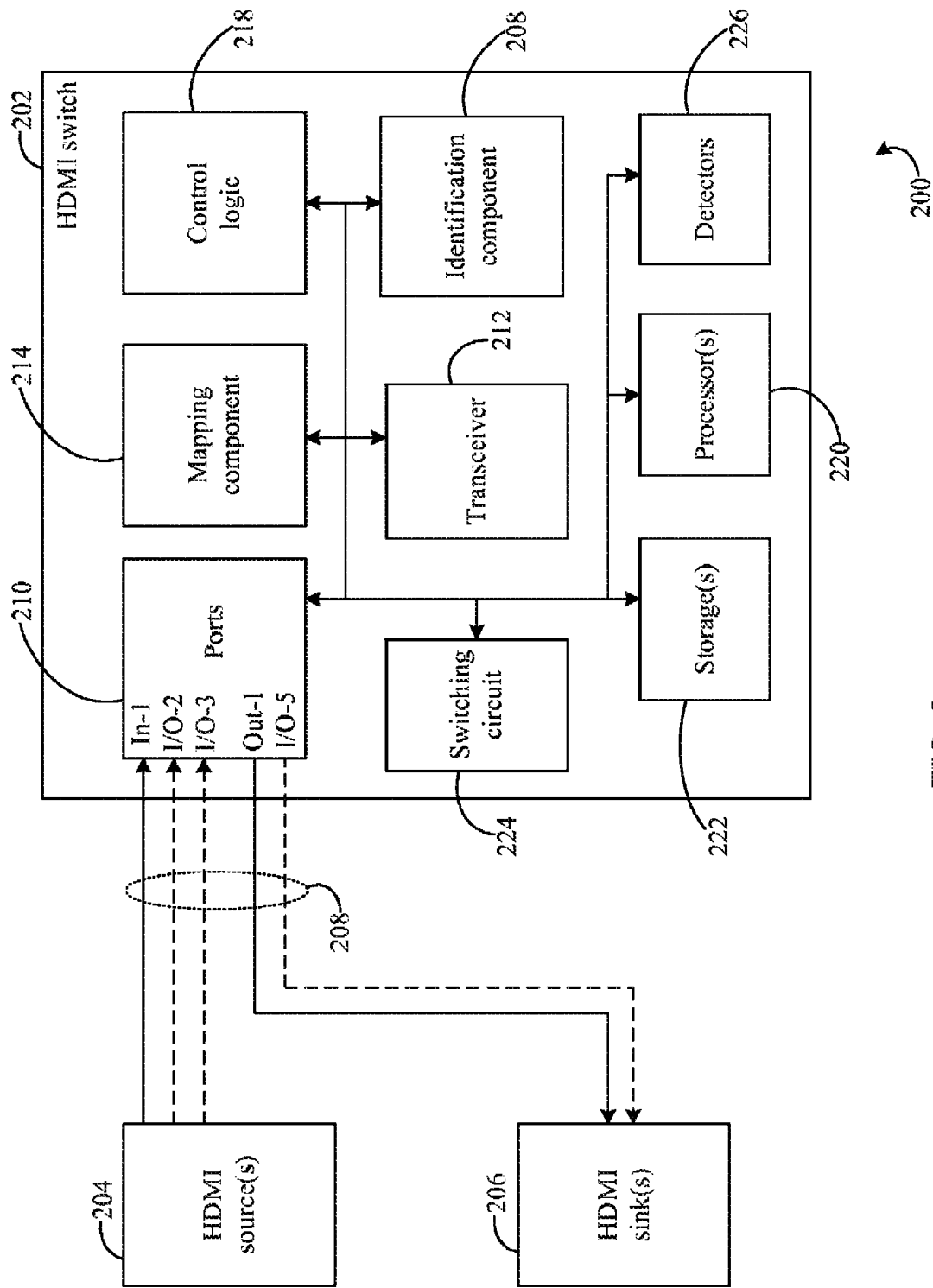
FIG. 2 is a block diagram of an HDMI smart switch configuration, according to an exemplary embodiment.

Turning now to FIG. 2, an exemplary implementation of a system 200 for an HDMI smart switch 202 (or switch herein) is shown. Switch 202 may include and/or encompass the embodiments described herein. That is, switch 202 of FIG. 2 is configured to perform methods and/or functions as described in embodiments using components and/or sub-components of the described embodiments. For instance, switch 202 is configured to automatically identify one or more electronic devices coupled to HDMI connectors/ports of switch 202 and map the identified electronic devices to the HDMI connectors/ports to which they are connected, according to embodiments.

In embodiments, switch 202 includes one or more components such as ports 210, one or more storages 222, one or more processors 220, a transceiver 212, a mapping component 214, control logic 218, a switching circuit 224, detectors 226, and/or an identification component 208. Switch 202 may be coupled to one or more HDMI sources 204 and/or to one or more HDMI sinks 206 via HDMI connections 208 as would be understood by persons of skill in the relevant art having the benefit of this disclosure.

Ports 210 may be one or more HDMI ports (i.e., HDMI connectors) as described herein. Ports 210 may be dynamically configured as input ports (e.g., In-1, corresponding to sources devices) or output ports (e.g., Out-1, corresponding to sink devices) according to the described embodiments. Ports of ports 210 may be referred to as universal HDMI ports as these ports may be dynamically configured as inputs or outputs on connection of an HDMI device. In other words, in system 200 there is no need to pre-define the function of any port of ports 210. Thus, the same physical port for ports 210 can act as an input or an output depending on which type of HDMI device is connected, and this considerably enhances the convenience of use for an HDMI switch. The port interface scheme is such that a repeater device or a switch (e.g., switch 202) is able to detect the type of device connected to the HDMI port and automatically configure the internal circuits to support either a sink or a source. Further details are found in U.S. patent application Ser. No. 14/945,079, entitled "AUTO DETECTION AND ADAPTIVE CONFIGURATION OF HDMI PORTS," the entirety of which is incorporated by reference herein.

Storage(s) 222 may be one or more of any storage device described herein, such as, but not limited to, those described below with respect to FIG. 19.

Processor(s) 220 may be one or more of any processing device or processor described herein, such as, but not limited to, those described below with respect to FIG. 19, and may be configured as described elsewhere herein.

Transceiver 212 is configured to receive and transmit wired and/or wireless data according to any protocol and/or embodiment described herein, such as HDMI in HDMI switch embodiments. For instance, transceiver 212 is configured to receive and to transmit audio/video signals according to HDMI protocols from HDMI sources and HDMI sinks respectively.

Detectors 226 are configured to detect indicia of operational modes to determine a type of an HDMI enabled electronic device connected to ports 210 (i.e., whether the device is a source or a sink). In embodiments, detectors 226 may be configured to make such a detection/determination based on signals received from pins of ports 210.

Identification component 208 may be implemented as hardware (e.g., electrical circuits), software (e.g., as executed by a processor or processing device), and/or firmware. Identification component 208 is configured to operate and perform functions according to the embodiments described herein. For example, identification component 208 is configured to identify electronic devices (e.g., HDMI sources 204 and HDMI sinks 206) coupled or connected to HDMI ports 210. That is, for each of HDMI sources 204 and HDMI sinks 206, identification component 208 is configured to determine one or more identifiers of the connected electronic devices, such as, but not limited to a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. These identifiers may be determined according to various techniques, such as, but not limited to: techniques based on HDMI consumer electronics control (CEC), Source Product Description (SPD), Extended display identification data (EDID), video data, audio data, IP network information, remote control operation by user, voice input from user, and explicit device selection by user. Identification component 208 provides the one or more identifiers to mapping component 214.

Mapping component 214 may be implemented as hardware (e.g., electrical circuits) software (e.g., as executed by a processor or processing device), and/or firmware. Mapping component 214 is configured to operate and perform functions according to the embodiments described herein. For example, mapping component 214 is configured to determine a device-to-port mapping based on one or more identifiers determined by identification component 208. Mapping component 214 may generate a data structure (e.g., a table or the like) that associates the identifiers for any given identified electronic device with the HDMI port of ports 210 to which that electronic device is coupled. In this way, the device-to-port mapping may indicate that a first electronic device (e.g., a Blu-ray® player) of HDMI sources 204 is connected to a first port (e.g., In-1) of ports 210, and that a second electronic device (e.g., a TV) of HDMI sinks 206 is connected to a second port (e.g., Out-1) of ports 210.

Based at least in part on one or more of the operating mode, the identifiers, and mappings received from detectors 226, identification component 208, and mapping component 214, control logic 218 is configured to provide a control signal to switching circuit 224 and/or to transceiver 212, causing switching circuit 224 to connect the identified electronic devices on ports of ports 210 to corresponding receiver portions or transmitter portions of transceiver 212 and/or causing transceiver 212 to output desired content received from HDMI sources 204 on a specified output port of ports 210.

Switching circuit 224 is configured to provide switched connections between ports 210 and transceiver 212. That is, switching circuit 224 may provide a connection between any port of ports 210 and any receiver component or transmitter component of transceiver 212. Switching circuit 224 may comprise one or more switch circuit portions (e.g., comprising one or more switches/switching elements) and may be combined or used in conjunction with other portions of system 200.

As an extension of the above-described embodiments, a smart HDMI switch (e.g., switch 202) may also be complemented by a smart application (app) that runs on devices such as smartphones, tablets, computers, TVs, etc. In embodiments, the smart app is configured to be in communication with the smart HDMI switch and to communicate with similar wireless interfaces (e.g., Wi-Fi, infrared (IR), Bluetooth®, ZigBee® RF4CE, etc.) as the smart HDMI switch for communicating with other devices.

A. Example Identification and Mapping Embodiments

According to embodiments, HDMI switches (e.g., switch 202) are configured to perform methods for generating a signature database and for identification and mapping of electronic devices. In the described embodiments, methods for generating a database of signatures are equivalent to methods for identifying electronic devices. That is, when a database of signatures is created according to embodiments, devices may be identified during such creation by identification processes. These identification processes are the same as the identification processes used to identify electronic devices during operation of an HDMI switch (e.g., by comparison to the created database of signatures), according to embodiments.

Figure 3:
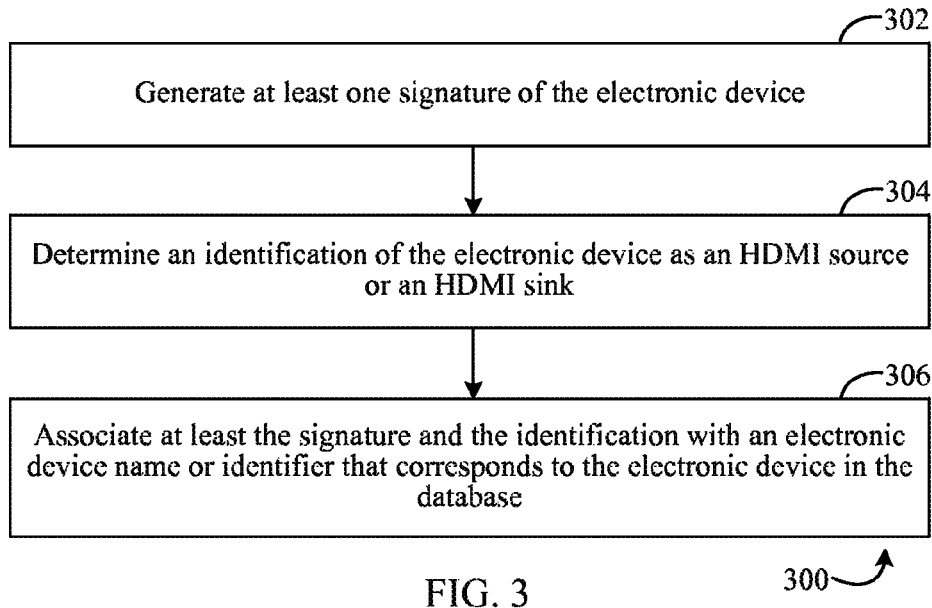
FIG. 3 is a flowchart of a method for creating a back-end database, according to an exemplary embodiment.

One such method noted above is for generating a database of signatures for automatic identification and mapping of an electronic device to a port on an HDMI switch using, e.g., identification component 208. For example, FIG. 3 is a flowchart 300 for such a method. Flowchart 300 is described as follows.

At least one signature of the electronic device is generated (302). For instance, an electronic device may have one or more distinguishing characteristics including, but not limited to, a type of the electronic device (e.g., a DVD player, a Blu-ray® player, a video game console, a streaming media device, a TV, an HDTV, a projector, etc.), a brand name of the electronic device, a manufacturer of the electronic device, a model number of the electronic device, etc. These characteristics may be determined according to various techniques, such as, but not limited to, techniques based on: HDMI consumer electronics control (CEC), Source Product Description (SPD), Extended display identification data (EDID), video data, audio data, IP network information, remote control operation by user, voice input from user, explicit device selection by user, and/or the like.

Figure 4:
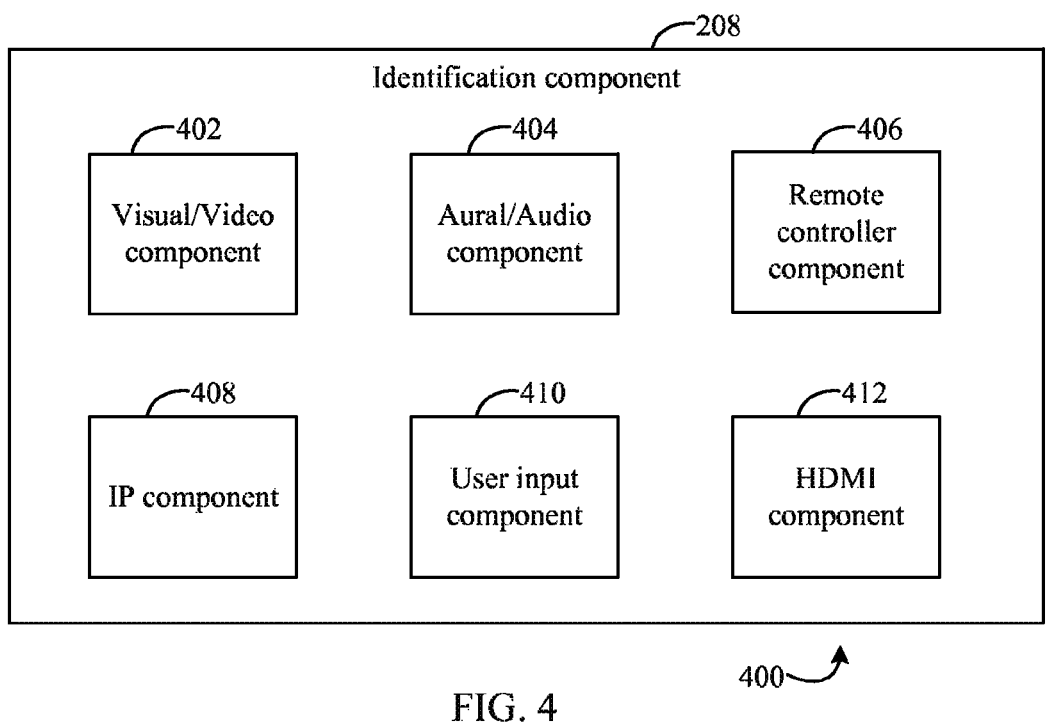
FIG. 4 is a block diagram of a portion of an HDMI smart switch configuration, according to an exemplary embodiment.

FIG. 4 is a block diagram of an identification component implementation 400 of identification component 208 of FIG. 2. As shown in FIG. 4, identification component 208 may include a visual/video component 402 configured to capture or determine visual/video characteristics, an aural/audio component 404 configured to capture or determine sound characteristics, a remote controller component 406 configured to capture or determine commands associated with remote controllers, an IP component 408 configured to capture or determine device IP characteristics, a user input component 410 configured to receive user input for device characteristics, and an HDMI component 412 configured to capture or determine device characteristics provided according to HDMI information as well as CEC protocol. It is contemplated, however, that in various embodiments, one or more components of identification component 208 as shown in FIG. 4 may not be included and that additional components may be included.

Identification component 208 is configured to generate, at least in part, at least one signature of an electronic device connected to a switch (e.g., switch 202) as in (302) of flowchart 300. For instance, visual/video component 402, aural/audio component 404, remote controller component 406, IP component 408, user input component 410, and HDMI component 412 are each configured to determine distinguishing characteristics of connected electronic devices and generate a device signature based thereon.

Figure 5:
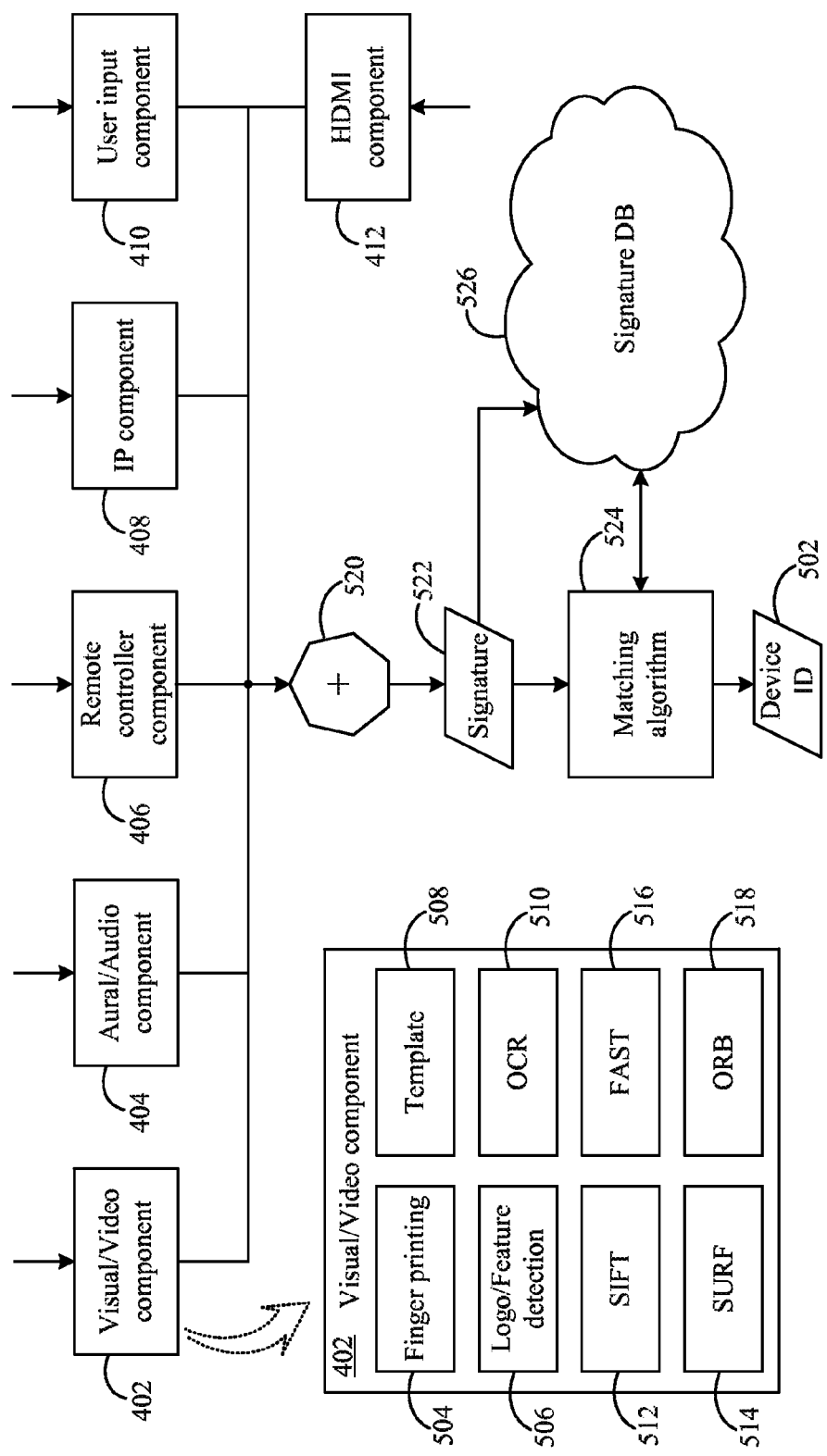
FIG. 5 is a block diagram of a high-level identification and port mapping scheme, according to an exemplary embodiment.

For example, in FIG. 5, an identification and mapping scheme 500 is shown. When a user plugs a device (e.g., of HDMI sources 204 or HDMI sinks 206) into an HDMI port of the switch (e.g., ports 210 of switch 202), the switch auto-configures to recognize the connected device and map the device to the port in which it is plugged. As shown, one or more of visual/video component 402, aural/audio component 404, remote controller component 406, IP component 408, user input component 410, and HDMI component 412 provide distinguishing characteristics to a combiner 520. Combiner 520 is configured to combine the different characteristics to generate a signature 522 for a given electronic device, and signatures 522 may be created for any number of electronic devices according to embodiments. Signature 522 is populated in a signature database (DB) 526, e.g., by processor(s) 220, for signature DB 526 creation. Signature DB 526 may be stored and maintained in storage(s) 222 or in a cloud storage (not shown).

Determining characteristics of devices to generate signatures may be performed in a variety of ways, according to embodiments.

1. Example HDMI Embodiments

In one embodiment, port mapping is performed using information in HDMI CEC communications. For instance, when CEC is implemented according to the specification, a sink device queries a source device for its Vendor ID, and the source is required to respond to that request with its Vendor ID. The Vendor ID is used to determine a name for the source device, and the port is mapped with that name. According to embodiments, a switch such as switch 202 is configured to act as a sink device, and therefore can initiate this Vendor ID request to identify a connected source device. For example, HDMI component 412 may initiate the CEC request from switch 202.

Extended display identification data (EDID) may be provided as data from an HDMI sink device upon connection to a smart switch (e.g., switch 202) and/or upon power up of the HDMI sink device if already connected to the smart switch. The EDID may include a device identification or ID of the HDMI sink device and the device ID may be used to check a database (e.g., signature DB 526) to identify the device by matching the ID to an entry in the database.

Source product description (SPD) information frames are provided as metadata along with Audio/Video data. Through SPD frames, information of the device can be extracted by HDMI component 412 of switch 202 and used in signature DB 526 creation. Likewise, when an electronic device, such as a source device, is plugged in to an HDMI switch (e.g., switch 202), SPD information from the electronic device may be checked against signature DB 526 as described herein.

It should be noted that the implementation of HDMI CEC is optional, and source device vendors may choose not to implement CEC. Furthermore, even when CEC is implemented, not all CEC functionality is necessarily implemented. In addition there may be deviations from the CEC specification for some source devices, and some vendor-specific implementation oddities can result in a fragmented and unreliable system. In view of these shortcomings, additional techniques and embodiments are provided for identification and mapping.

For example, when CEC is not implemented in a source device, a smart HDMI switch, e.g., switch 202, is configured to capture video data from the source device in order to match known patterns to recognize/identify the device for port mapping. Examples of known patterns include, without limitation, a logo, a boot up screen, a home screen, watermarks, unique menus, keywords, etc. In the context of the following description, a logo is referred to in reference to these patterns, though any pattern is contemplated in embodiments.

2. Example Video Embodiments

Example video identification and mapping embodiments for device signatures are described in this sub-section with respect to FIG. 5 introduced above and FIGS. 6-12 described below.

For instance, FIG. 6 is a flowchart 600 for generating a device signature. In flowchart 600, at least one signature of the electronic device is generated that comprises a video signature (602). For example, visual/video component 402 of identification and mapping scheme 500 (FIG. 5) is configured to capture or determine visual/video characteristics to be used in generating a video signature aspect/component of a device signature (e.g., signature 522) by combiner 520.

The video signature aspect/component may be captured or determined in various ways according to embodiments. For instance, as shown in FIG. 5, visual/video component 402 may include a plurality of sub-components, including a finger printing component 504, a logo/feature detection component 506, a template component 508, an OCR (optical character recognition) component 510, a SIFT (scale-invariant feature transform) component 512, a SURF (speeded-up robust features) component 514, a FAST (features from accelerated segment test) component 516, and an ORB (oriented FAST rotated binary robust independent elementary features (BRIEF)) component 518. Each of these sub-components is configured to capture or determine video aspects and characteristics for signatures, according to embodiments. For example, when a source device is connected to a smart switch (e.g., switch 202) and powered on, visual/video signature aspects/components may be generated according to video signals provided across switch 202 to a sink device as illustrated in FIGS. 7A-7C.

Figure 7A:
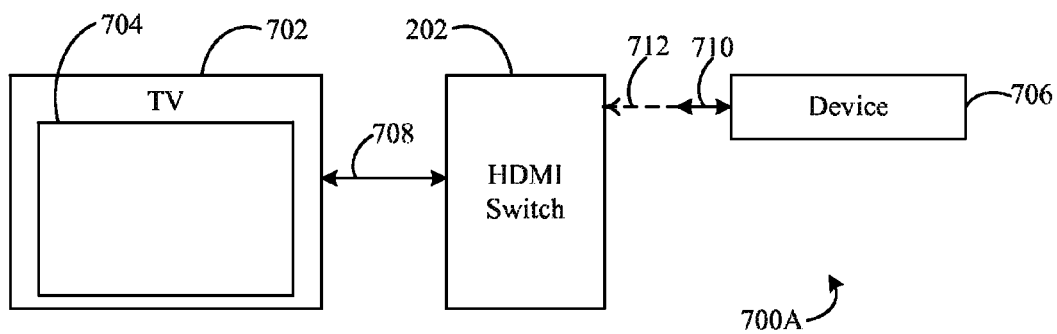
FIGS. 7A-7C are block diagrams of system setup and device signature capture, according to an exemplary embodiment.

Turning now to FIG. 7A, a device connection block diagram 700A is shown. For example, switch 202 is connected to a TV 702 (i.e., a sink device), having a display 704, over an HDMI connection 708. A source device 706 (e.g., a Blu-ray® player) is to be connected by a plug 712 to form an HDMI connection 710. HDMI connection 710 allows video data to be provided by source device 706 to TV 702 via switch 202 and HDMI connection 708.

Figure 7B:
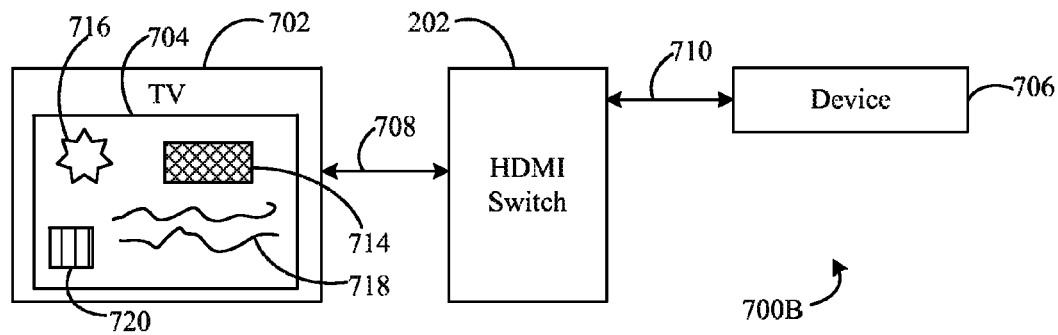
Figure 7C:
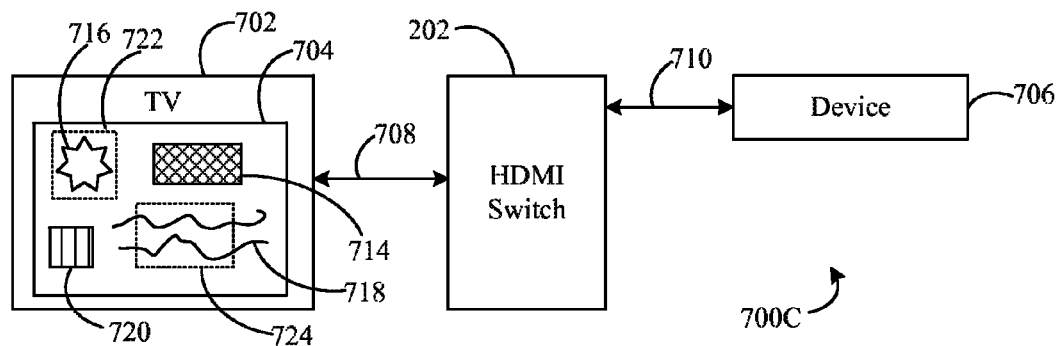

FIG. 7B is a video/visual characteristic display block diagram 700B which is a further embodiment of device connection block diagram 700A of FIG. 7A. For instance, in video/visual characteristic display implementation 700B, HDMI connection 710 is formed, source device 706 and switch 202 are powered ON, and video content is presented on display 704. Video content may include images 714, logos 716, text or text blocks 718, and pixel templates 720, and the structure of such video content may be captured and analyzed by visual/video component 402 and provided to combiner 520 of FIG. 5 to generate a device signature 522 that includes a video signature component as in (602) of flowchart 600.

Figure 8:
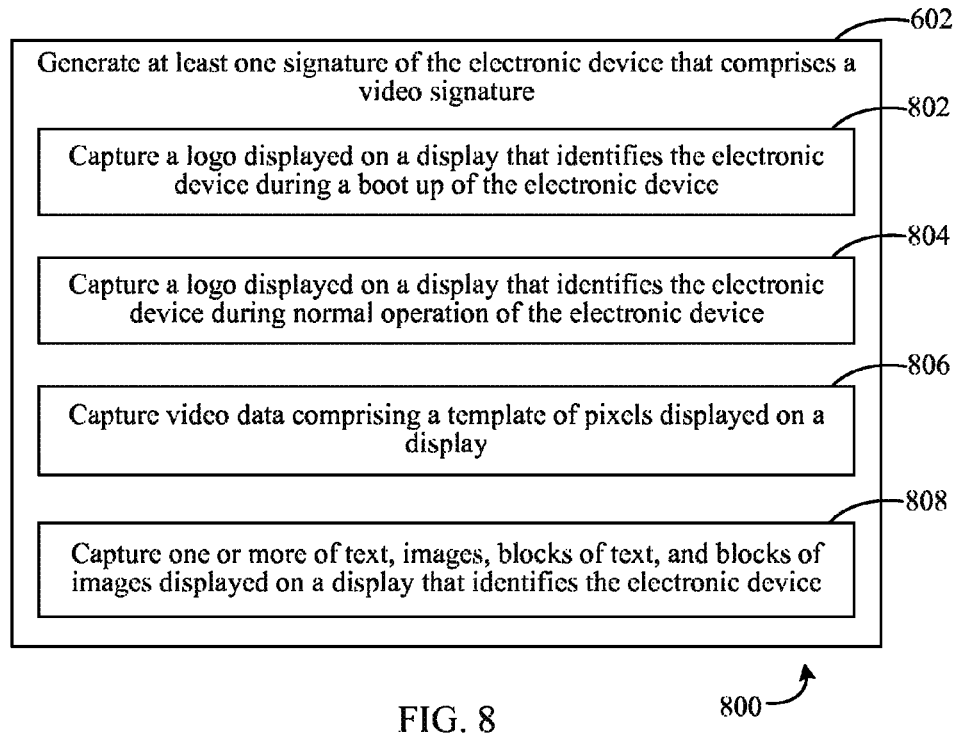
FIG. 8 is a flowchart of a method for creating a device signature, according to an exemplary embodiment.

The above-described types of video content and characteristics may be captured in various ways according to embodiments. Turning to FIG. 8, a flowchart 800 with further operations for generating a signature of the electronic device that comprises a video signature as in flowchart 600 is shown. Flowchart 800 comprises a number of operations that may or may not be performed according to embodiments for generating a signature of an electronic device that comprises a video signature. Flowchart 800 is described as follows.

A logo displayed on a display that identifies the electronic device during a boot up of the electronic device is captured (802). Alternatively, or in addition, to (802), a logo displayed on a display that identifies the electronic device during normal operation of the electronic device is captured (804). For example, as shown in FIG. 7B, logo 716 is presented on TV 702 via display 704. Logo 716 may be displayed either during boot up of the electronic device (e.g., device 706 of FIG. 7B), or during normal operation of the electronic device, and may be captured by visual/video component 402 via logo/feature detection component 506, and provided to combiner 520 of FIG. 5 to generate a device signature 522 that includes a video signature component.

Many images have features which can be used to define some uniqueness associated with the image. A set of features such as edges, corners, and blobs can be used to define a logo such as logo 716. There are several known algorithmic processes for feature detection, and according to embodiments, logo/feature detection component 506 operates through a combination of these techniques. The described techniques can be made scale invariant or shift invariant. Each feature has a descriptor, which defines the feature in a bit representation. Features are matched using the descriptors.

Some known techniques for feature detection are a scale-invariant feature transform (SIFT) process, a speeded-up robust features (SURF) process features from accelerated segment test (FAST) process, and an oriented FAST rotated binary robust independent elementary features (BRIEF) (ORB) process.

SIFT and SURF are known proprietary techniques, and ORB is an open source techniques and suitable substitute for SIFT and SURF. ORB is a combination if FAST and BRIEF. FAST is used for feature detection and BRIEF is used for feature matching. Hence using ORB keypoints and descriptors are extracted from the logo that is to be searched. These descriptors are matched with each frame of the video and a FLANN (Fast Library for Approximate Nearest Neighbors) based matcher is used to find the best matches.

Figure 10:
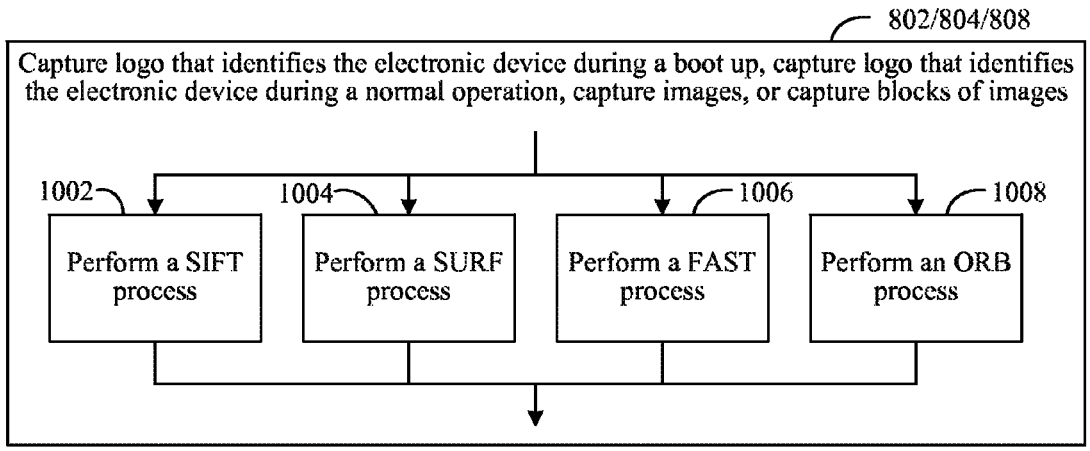
FIG. 10 is a flowchart of a method for creating a device signature by feature recognition, according to an exemplary embodiment.

FIG. 10 is a flowchart 1000 for capturing a logo that identifies an electronic device during a boot up or during a normal operation, capturing images, or capturing blocks of images. In embodiments, SIFT component 512 is configured to perform a SIFT process (1002), SURF component 514 is configured to perform a SURF process (1004), FAST component 516 is configured to perform a FAST process (1006), and ORB component 518 is configured to perform an ORB process (1008) according to flowchart 1000.

Elements of flowchart 1000 may be performed as extensions of elements of flowchart 800 of FIG. 8 (e.g., (802), (804), and/or (808) described below), according to the described embodiments.

Video data comprising a template of pixels displayed on a display is captured (806). For instance, as shown in FIG. 7B, pixel templates 720 are presented on TV 702 via display 704. In embodiments, pixel templates 720 comprise a plurality of pixels each having associated pixel information which may be compared between templates. Pixel templates 720 may be displayed either during boot up of the electronic device (e.g., device 706 of FIG. 7B), or during normal operation of the electronic device, and may be captured by visual/video component 402 via template component 508, and later provided to combiner 520 of FIG. 5 to generate a device signature 522 that includes a video signature component.

Template component 508 is configured to perform a template matching scheme to directly compare pixel information of pixel template 720 images. For instance, a pixel template 720 from an audio/video stream may be compared to a pixel template associated with a signature in signature DB 526. According to embodiments, template component 508 is configured to implement different algorithms for pixel information comparison. For example, FIG. 11 is a flowchart 1100 for capturing video data that includes a template of pixels, e.g., pixel templates 720 of FIGS. 7B and 7C.

Figure 11:
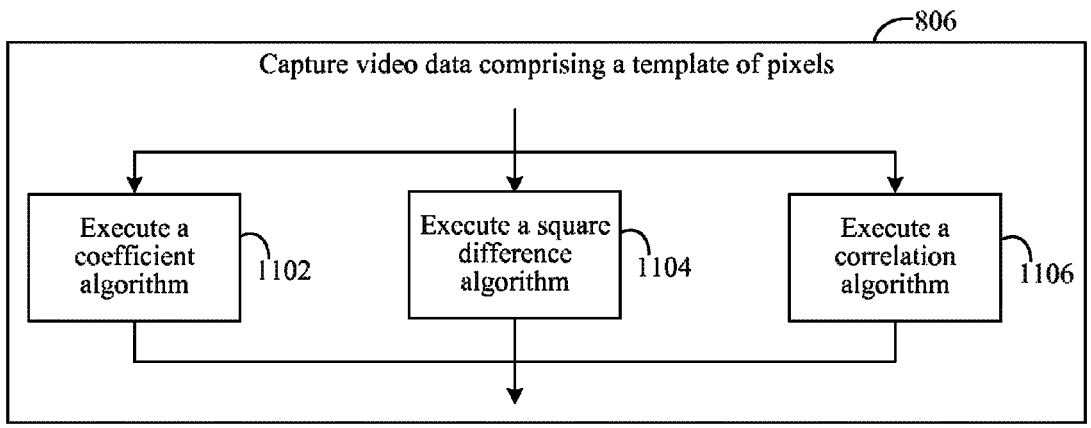
FIG. 11 is a flowchart of a method for creating a device signature by pixel templates, according to an exemplary embodiment.

Template component 508 is configured to perform pixel template matching according to FIG. 11. FIG. 11 is described as follows.

A coefficient algorithm is executed (1102). A coefficient algorithm may be implemented by template component 508, and in embodiments, a square difference algorithm is executed (1104) in addition to (1102) in order to minimize false detections. That is, (1104) may be implemented as a second level of checking to compare a detected template (e.g., pixel templates 720) against a template from the database (e.g., signature DB 526), using a square difference algorithm.

In addition to or in lieu of (1102) and/or (1104), a correlation algorithm is executed (1106). In embodiments, template component 508 may perform a correlation algorithm. In one embodiment, template component 508 is configured to detect a correlation of greater than 0.99 to determine that a pixel template match has been found, although in other embodiments, correlation factors indicating other degrees of correlation may be used. Templates in the database (e.g., signature DB 526) are created from the actual frames of video data, and therefore may be dependent on the source video resolution.

Elements of flowchart 1100 may be performed as extensions of elements of flowchart 800 of FIG. 8 (e.g., (806)), according to the described embodiments.

Figure 12:
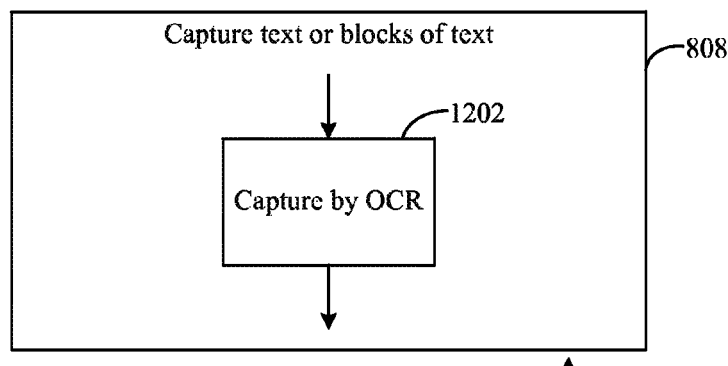
FIG. 12 is a flowchart of a method for creating a device signature by optical character recognition (OCR), according to an exemplary embodiment.

Referring back to flowchart 800 of FIG. 8, one or more of text, images, blocks of text, and blocks of images displayed on a display that identifies the electronic device are captured (808). For instance, as shown in FIG. 7B, text/blocks of text 718 and images 714 are presented on TV 702 via display 704. Text/blocks of text 718 and images 714 may be displayed either during boot up of the electronic device (e.g., device 706 of FIG. 7B), or during normal operation of the electronic device, and may be captured by visual/video component 402 via logo/feature detection component 506, and later provided to combiner 520 of FIG. 5 to generate a device signature 522 that includes a video signature component. In FIG. 12, a flowchart 1200 is provided for capture of text or blocks of text. Text and blocks of text includes capturing by optical character recognition (OCR) (1202). In embodiments, text/blocks of text 718 are captured by OCR component 510.

According to embodiments, based on the presence of certain keywords in the video frame, the video frame can be inferred to have originated from a particular electronic device. In addition, groupings of certain words also provide information sufficient to identify the associated electronic device. Accordingly, text in the video frame can be used as a means for signature database creation and device identification. As noted herein, to extract text from an image, OCR techniques are used. An incoming image from a video frame initially undergoes some preprocessing that involves a morphological gradient operation followed by thresholding to create a binary image. Subsequently, the textual parts of the image are segmented by applying morphological closing operations first on the binary image using a horizontally oriented rectangular structuring element. This helps in obtaining contours around the textual regions, which are then used to segment out smaller images containing individual word(s). The actual text is extracted out of these segmented images. The order in which words appear is also maintained during extraction, thus a text output is obtained for every image in embodiments.

This text output is then passed to a text filtering engine for text-based mapping to obtain the probable electronic device candidates. For this, a database (e.g., signature DB 526 of FIG. 5) containing a mapping of devices to a word or sequence of words is maintained. Two aspects are involved in this stage: 1) a character by character comparison of each input word is performed with known words to obtain a word match; and 2) a word by word comparison is performed to identify the word-sequence corresponding to the appropriate device. The resultant output of the process is a device match for the detected text.

Referring now to FIG. 7C, a video/visual signature block diagram 700C which is a further embodiment of device connection block diagram 700A of FIG. 7A and video/visual characteristic display block diagram 700B is provided. As illustrated, logo 716 is used to generate a fingerprint 722, and text or text blocks 718 is captured using OCR techniques 724 as described above with respect to (808) of flowchart 800 and (1202) of flowchart 1200. In FIG. 7C, as noted above, known patterns include logo 716 and other patterns such as watermarks, unique menus, keywords, and/or the like that may be isolated and analyzed to identify an electronic device.

Referring back to FIG. 5, finger printing component 504 is configured to create a unique fingerprint representation of an image. As described herein, a fingerprint created from an image is a unique representation of that image that provides a significant size reduction over the image itself. Finger printing component 504 is configured to receive visual/video data from a device (e.g., HDMI sources 204 or HDMI sinks 206) connected to a switch (e.g., switch 202 of FIG. 2) and generate a fingerprint representation related to the device. Finger printing component 504 is configured to facilitate simple image identification based on the fingerprint representation of the entire image content.

Figure 9:
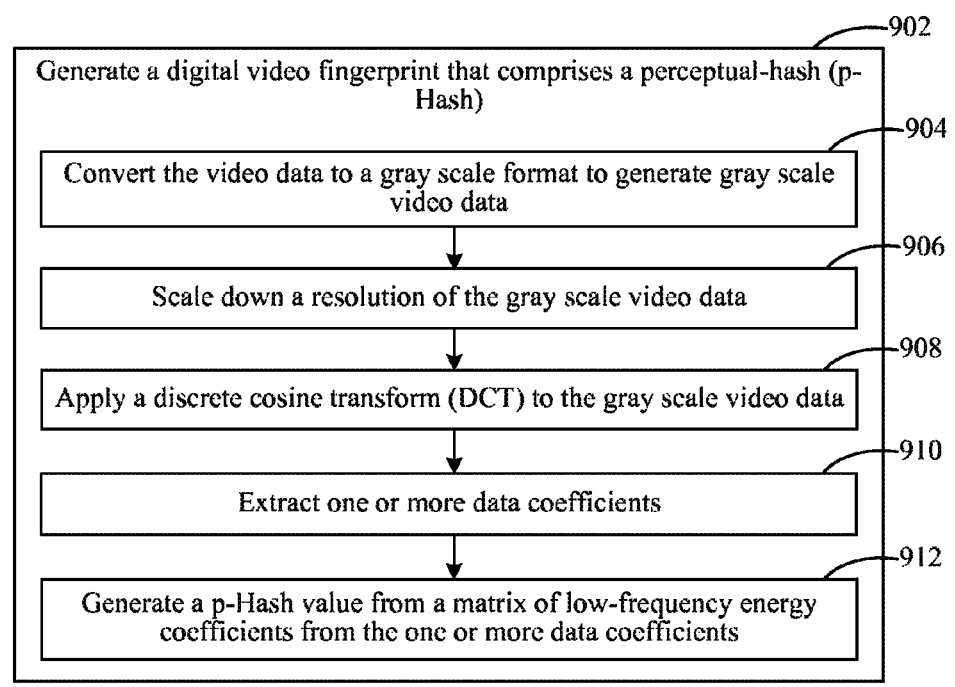
FIG. 9 is a flowchart of a method for creating a device signature by fingerprinting, according to an exemplary embodiment.

For example, FIG. 9 is a flowchart 900 for generating a fingerprint. Flowchart 900 is described as follows.

A digital video fingerprint is generated that comprises a perceptual-hash (p-Hash) (902). In embodiments, finger printing component 504 is configured to generate a fingerprint using a perceptual-hash (p-Hash) of the image. P-Hashes capture the perceptual information in an image into a fingerprint. Accordingly, similar looking images will have fingerprints which are similar. In embodiments, images from a device connected to a switch (e.g., switch 202 of FIG. 2) can be used to identify the device by matching fingerprints of the received images to fingerprints created from a known set of images. For this purpose, a database of fingerprint values can be maintained in signature DB 526 (and/or in storage(s) 222 of FIG. 2).

According to embodiments, various techniques for creating a p-Hash may be used. One such technique to create a p-Hash of an image is described here. The video data is converted to a gray scale format to generate gray scale video data (904) and a resolution of the gray scale video data is scaled down (906). For instance, an image received from a connected device is converted to a gray scale color format, and is scaled down linearly to a smaller, or lower, resolution (e.g., a resolution of 160 pixels by 90 pixels).

A discrete cosine transform (DCT) is applied to the gray scale video data (908), and one or more DCT data coefficients are extracted (910). For example, the lower set of 8×8 coefficients from the set obtained from the applied DCT (908) is extracted (910) for the p-Hash value calculation. This 8×8 set of coefficients represents the low frequency energy of the image. The hash value is then calculated using this coefficient set.

A p-Hash value is generated from a matrix of low-frequency energy coefficients from the one or more data coefficients (912). For instance, the mean value of the 64 coefficient values (i.e., from the 8×8 set) is calculated. The hash value, which is a 64 bit number in embodiments, is then obtained by populating each bit with either '1' or '0', based on the value of each element in the set of 64 coefficient values relative to the mean. For instance, if the element is greater than (or equal to) the mean value, then it results in the corresponding bit being '1', otherwise it is '0'.

The order in which the 64 elements are parsed for creating the hash value does not matter in embodiments as long the same order is followed for database creation as well as for identification. In embodiments, the matching between two hash values is done by calculating the Hamming distance between them, where the lower the distance, the better the match. This matching operation is performed by matching algorithm component 524 in embodiments.

Furthermore, according to embodiments, one or more elements of flowchart 900 may be performed subsequent to one or more elements of flowchart 800 of FIG. 8. That is, captured logos, pixel templates, images, text, blocks thereof, and/or the like may be used to create fingerprints to generate a signature DB (e.g., signature DB 526 of FIG. 5) and to identify devices and map ports accordingly.

3. Example Audio Embodiments

In addition to video information, audio signals can be used to identify and map an electronic device. Audio signals may be received by aural/audio component 404 as shown in FIG. 5. For audio-based detection, the incoming audio can be segmented into frames of any suitable size. In embodiments, a frame size which maintains stationarity property of audio is chosen. Information can then be extracted from these frames in order to uniquely characterize the frames. The extracted information is then compared against information stored in a database (e.g., signature DB 526) to obtain a match. As in the case of video detection, the procedure employed to obtain the attributes of audio frames is the same for the database creation and live detection, according to embodiments.

A number of techniques are available which can be used to characterize audio. Aural/audio component 404 of FIGS. 4 and 5 is configured to perform such techniques. For instance, FIG. 13 is a flowchart 1300 for creating audio signatures to identify electronic devices by aural/audio component 404. FIG. 13 is described as follows.

At least one audio signature of the electronic device is captured (1302). For example, aural/audio component 404 of FIGS. 4 and 5 may capture audio information used to generate audio signatures. In embodiments, aural/audio component 404 is configured to capture audio signatures by correlation, Mel Frequency Cepstral Coefficients (MFCC), timbre recognition, and/or spectral flatness measures.

The at least one audio signature is associated with the electronic device name or identifier (1304). For database creation, the captured audio signature is associated with a device name or ID in the database, e.g., signature DB 526.

For correlation embodiments, a value of a maximum for an audio signal may be obtained by aural/audio component 404 and stored in a database, such as signature DB 526, for database creation where the correlation information is associated with a device name or ID. For identification, a maximum of an incoming audio segment is correlated with maxima of stored audio segments in the database. The correlated value of the maxima will indicate the degree of similarity between the audio segments being considered. According to embodiments, a value of 1 indicates an exact match.

In embodiments, MFCC is used to describe the audio frame. MFCC takes into account human auditory behavior to derive coefficients. The obtained coefficients can be stored in a database, such as signature DB 526, for database creation where the coefficient information is associated with a device name or ID. For a detected electronic device, MFCCs are captured and compared with MFCCs of different devices stored in the database for identification.

Timbre recognition may also be performed by aural/audio component 404 in embodiments. Timbre is the characteristic which differentiates two audio components even if they have the same pitch and loudness. This is typically useful in differentiating between various musical instruments. Timbre may be utilized in embodiments for electronic devices having instrumental background scores as audio outputs (e.g., during boot up, while displaying a home screen, during menu displays, etc.). The audio can be characterized to come from a particular instrument or belong to a particular family of instruments by timbre recognition. Timbre recognition information may be stored and associated with the source electronic device (by name or ID) in a in a database, such as signature DB 526, for database creation. The source electronic device can then be identified based on this information during normal operation. Timbre information can also be used in tandem with additional audio (and other) techniques described herein to improve matching.

A spectral flatness measure that indicates how flat the spectrum of a given audio segment is may also be captured by aural/audio component 404 in embodiments. Spectral flatness is measure to characterize audio segments, and may be stored and associated with the source electronic device (by name or ID) in a in a database, such as signature DB 526, for database creation. Spectral flatness may also be used to narrow down searches for matching results obtained through other techniques described herein.

One or more of the above audio techniques may be used either independent of the video techniques or in combination therewith in embodiments.

4. Example IP Embodiments

Many consumer electronics (CE) devices support IP connectivity and control. Such devices can be discovered on an IP network and then controlled over the IP network to perform required actions (e.g., power toggle, home screen navigation, etc.). Few other devices provide the ability to send audio, video, and/or images to IP supportive devices over the IP network. In such cases, a known audio segment, video data, and/or an image can be provided to IP supportive devices. The outcome of these providing actions can then be used by IP component 408 of FIGS. 4 and 5 for database creation (e.g., signature database 526) and device identification by validating outcomes on an HDMI port of a smart HDMI switch (e.g., of ports 210 of switch 202), according to embodiments.

For example, in the case of devices that can be controlled through an IP message, e.g., a power OFF message, IP component 408 is configured to perform a verification as to whether there is any signal activity on HDMI ports of the HDMI switch. In other cases where a known screen of the device can be brought up through an IP message, e.g., to display a home screen, IP component 408 is configured to allow video identification in conjunction with logo/feature detection component 506 to verify the home screen is displayed. Similarly sending video or image to the device over IP can also be verified. In cases where audio segments for CE devices can be sent over IP networks, IP component 408 is configured to allow audio identification and validation in conjunction with aural/audio component 504.

5. Example Remote Control Embodiments

In embodiments, database creation, device identification, and port mapping are performed based, at least in part, on intercepting remote control operations by a user. That is, in some cases, an electronic device can be detected by understanding or comparing the captured remote control emissions. Remote controllers may be varying across infrared (IR), Wi-Fi, Bluetooth®, ZigBee® RF4CE, etc., in embodiments. FIG. 14 is a flowchart 1400 for leveraging remote control commands. FIG. 14 is described as follows.

A remote control database portion of related remote controls and their respective infrared (IR) codes or radio frequency (RF) signatures is generated (1402). For example, remote controller component 406 of FIGS. 4 and 5 is configured to intercept remote control commands. Remote controller component 406 is configured to provide remote controls and associated IR codes/RF signatures to combiner 520 to generate signature 522 including such remote control information. Signature 522 may be stored in signature DB 526 in embodiments.

The remote control database portion is associated with the electronic device name or identifier (1404). That is, for database creation, the appropriate electronic device is associated with the remote controls and their respective infrared (IR) codes or radio frequency (RF) signatures is generated in (1402) in signature DB 526.

6. Example User Input Embodiments

In some embodiments, an unknown or proprietary device may be connected to an HDMI switch such as switch 202. In such case, user input component 410 of FIGS. 4 and 5 may be configured to prompt a user, e.g., via a message on a sink device display such as display 704 of TV 702, to enter a device name either via input devices or by voice. Such prompted user input may be stored in signature DB 526 and associated with the unknown or proprietary device.

7. Example Source/Sink Embodiments

Referring back to FIG. 3 and flowchart 300, an identification of the electronic device as an HDMI source or an HDMI sink is determined (304). For example, in embodiments, a determination is made as to whether the electronic device is an HDMI source or an HDMI sink by detectors 226 of FIG. 2. As noted above, detectors 226 are configured to detect indicia of operational modes to determine a type of an HDMI enabled electronic device connected to ports 210 (i.e., whether the device is a source or a sink). In embodiments, detectors 226 may be configured to make such a detection/determination based on signals received from pins of ports 210 of switch 202, such as a hot-plug detect pin and a +5V power pin. For example, when an electronic device is connected to a port of ports 210 of switch 202, a voltage detected at the hot-plug detect pin of that port indicates an HDMI sink device has been connected. Similarly, when an electronic device is connected to a port of ports 210 of switch 202, a +5V voltage detected at the +5V power pin of that port indicates an HDMI source device has been connected. Detectors 226 are configured to detect such voltages and provide a corresponding indication to identification component 208.

Further details of such detection may be found in U.S. patent application Ser. No. 14/945,079, entitled "AUTO DETECTION AND ADAPTIVE CONFIGURATION OF HDMI PORTS," the entirety of which is incorporated by reference herein.

Additionally, as described herein, HDMI messaging (e.g., EDID, SPD, and/or CEC) may be used to determine Vendor IDs of electronic devices connected to an HDMI switch. That is, if a Vendor ID is returned in response to a request from a switch, e.g., switch 202, the electronic device returning the Vendor ID is a source. Accordingly, HDMI component 412 is also configured to determine the identification of the electronic device as an HDMI source.

8. Example Association Embodiments

At least the signature and the identification are associated with an electronic device name or identifier that corresponds to the electronic device in the database (306). For example, as described in the preceding sub-sections, signatures and identifications of electronic devices are stored in a database, e.g., signature DB 526, during database creation. When stored, the identifying information is associated with the name or ID of the electronic device in the database. As previously noted, signatures may comprise a variety of information related to characteristics of electronic devices such as, but not limited to, video, audio, source/sink, IP, EDID/SPD/CEC (i.e., HDMI), remote control, etc., to be associated with identifiers of electronic devices in the database. The association of signatures and identification information with electronic device names/IDs creates entries in the database each of which comprise a complete set of data for mapping ports according to the embodiments herein.

9. Example Operational Identification Embodiments

Referring again to FIG. 5, after signature DB 526 creation, electronic devices such as CE devices may be plugged into switch 202. During operation of switch 202, as noted above, identification of devices takes place using one or more of the identification techniques and embodiments in the preceding sections and sub-sections in the same manner. That is, when a database of signatures is created according to embodiments, devices may be identified during such creation by identification processes, and these identification processes are the same as the identification processes used to identify electronic devices during operation of an HDMI switch (e.g., by comparison to the created database of signatures).

Accordingly, one or more of visual/video component 402, aural/audio component 404, remote controller component 406, IP component 408, user input component 410, and HDMI component 412 are each configured to determine distinguishing characteristics of connected electronic devices and generate device signature 522 based thereon via combiner 520. Signature 522 is compared using a matching algorithm component 524 to signature DB 526 that stores the plurality of generated device signatures and associated device identifiers described herein. When a device is plugged into switch 202 during operation, a match between signature 522 and an entry in signature DB 526 causes a device identifier (ID) 502 to be provided. Device ID 502 is used to map a connected device to its associated port of ports 210 by mapping component 214 described herein.

Figure 16:
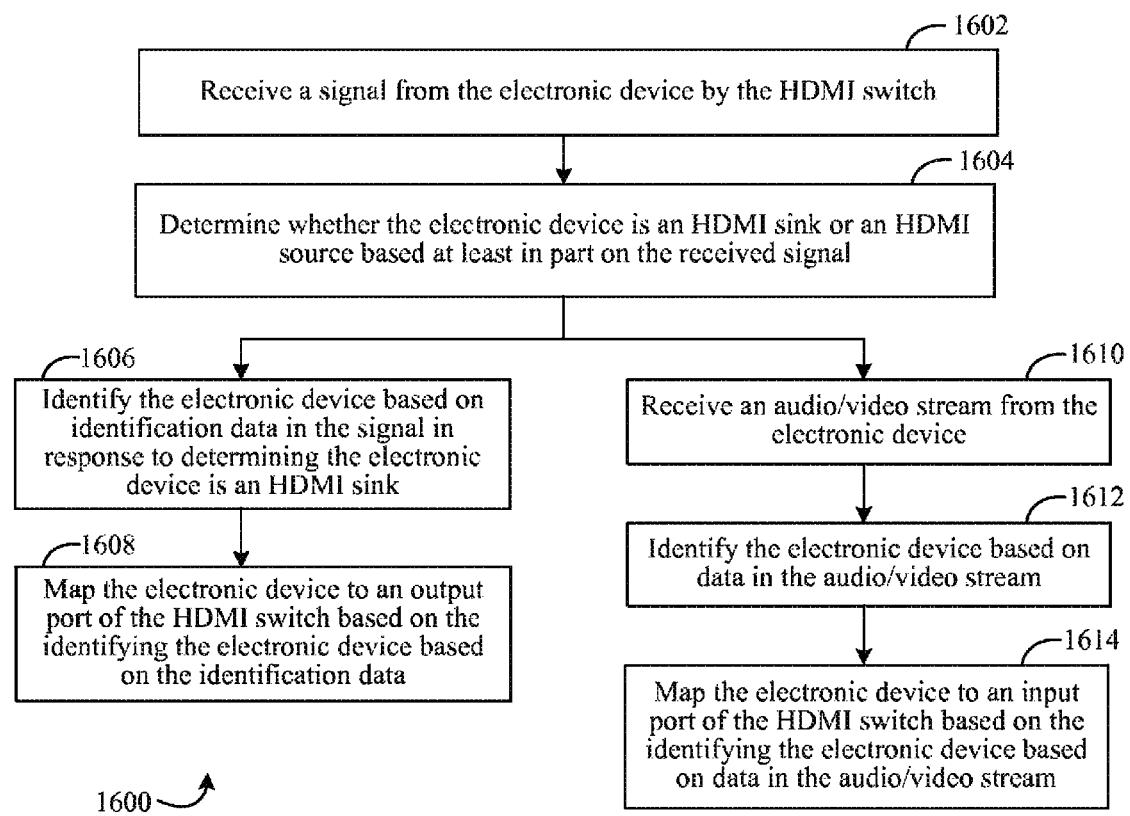
FIG. 16 is a flowchart of a method for device identification and port mapping, according to an exemplary embodiment.

FIG. 16 is a flowchart 1600 for operational identification and mapping of devices to ports of an HDMI switch. Flowchart 1600 may be performed by an HDMI switch such as switch 202 and one or more of the components thereof described herein. Flowchart 1600 is described as follows.

A signal is received from the electronic device by the HDMI switch (1602). For example, when an electronic device such as HDMI sources 204 or HDMI sinks 206 of FIG. 2 are connected to switch 202, signals on HDMI connections 208 from the electronic devices may be received by switch 202.

It is determined whether the electronic device is an HDMI sink or an HDMI source based at least in part on the received signal (1604). For instance, as described in the "Source/Sink Embodiments" and "HDMI Embodiments" sub-sections above, detectors 226 may determine whether a device is a source or a sink in some embodiments, and HDMI component 412 may determine whether a device is a source or a sink in some embodiments.

An electronic device may be identified in a number of ways, as noted in the sections and sub-sections above. For instance, an electronic device may be identified by identification data in the received signal (of 1602), or an electronic device may be identified by signatures such as signatures determined from an audio/video stream of the electronic device.

The electronic device is identified based on identification data in the signal in response to determining the electronic device is an HDMI sink (1606). For instance, if in (1604) a sink device is determined, as described in the "HDMI Embodiments" sub-section above, HDMI component 412 may determine a device ID from EDID information provided by the sink device after being connected to a switch.

An audio/video stream is received from the electronic device (1610). For example, if the electronic device is not determined to be a sink, an audio/video stream is provided from the device (i.e., a source device) to the switch.

The electronic device is identified based on data in the audio/video stream (1612). For instance, signatures determined from the audio/video stream by identification component 208 may be used to identify the electronic device, as described in the embodiments herein.

B. Example Mapping Embodiments

Continuing with FIG. 16 and flowchart 1600, the electronic devices may be mapped to ports of the switch in embodiments.

The electronic device is mapped to an output port of the HDMI switch based on the identifying the electronic device based on the identification data (1608). For example, continuing from (1606) above, when an electronic device is determined to be a sink, the electronic device is mapped to an output port of the switch. As shown in FIG. 2, one of sink devices 206 is mapped to an output port (e.g., Out-1) of switch 202. Further to physically mapping the device to an output port, the port and device ID are linked as part of an identification mapping, as described with respect to Table 1 below.

The electronic device is mapped to an input port of the HDMI switch based on the identifying the electronic device based on data in the audio/video stream (1614). For example, continuing from (1612) above, when an electronic device is determined to be a source, the electronic device is mapped to an input port of the switch. As shown in FIG. 2, one of source devices 204 is mapped to an input port (e.g., In-1) of switch 202. Further to physically mapping the device to an input port, the port and device ID are linked as part of an identification mapping, as described with respect to Table 1 below.

As noted above, mapping component 214 is configured to determine a device-to-port mapping based on one or more identifiers determined by identification component 208 and device signature 522. Mapping component 214 is configured to perform functions according to (1608) and (1614) of flowchart 1600 noted above. Mapping component 214 may generate a data structure (e.g., a table, e.g., as shown in Table 1 of mapping 1500 of FIG. 15, or the like) that associates the identifiers for any given identified electronic device with the HDMI port of ports 210 to which that electronic device is coupled. In this way, the device-to-port mapping may indicate that a first electronic device (e.g., a Blu-ray® player) of HDMI sources 204 is connected to a first port (e.g., In-1) of ports 210, and that a second electronic device (e.g., a TV) of HDMI sinks 206 is connected to a second port (e.g., Out-1) of ports 210, as illustrated in Table 1 of FIG. 15. Information for mapping 1500 may be stored in storage(s) 222 of switch 202, or other storage of switch 202, or in a cloud storage (not shown).

Mapping component 214 is configured to provide mapping information to control logic 218. In an embodiment, based at least in part on the mapping information from mapping component 214, control logic 218 is configured to provide a control signal to switching circuit 224 and/or to transceiver 212, causing switching circuit 224 to connect the identified electronic devices on ports of ports 210 to corresponding receiver portions or transmitter portions of transceiver 212 and/or causing transceiver 212 to output desired content received from HDMI sources 204 on a specified output port of ports 210.

That is, as noted herein, switching circuit 224 may provide a connection between any port of ports 210 and any receiver component or transmitter component of transceiver 212. According to mapping embodiments, when an electronic device is connected (i.e., plugged in) to a port of ports 210 on switch 202, switch 202 is configured to auto-configure the connected port appropriately for sink devices (as output port, connected to transmitter of transceiver 212) and for source devices (as input port, connected to receiver of transceiver 212). In other words, ports 210 of switch 202 are universal input/output HDMI ports that may be appropriately configured via auto-detection and adaptive configuration without being pre-designated and pre-defined for any specific type (i.e., input or output).

Figure 17:
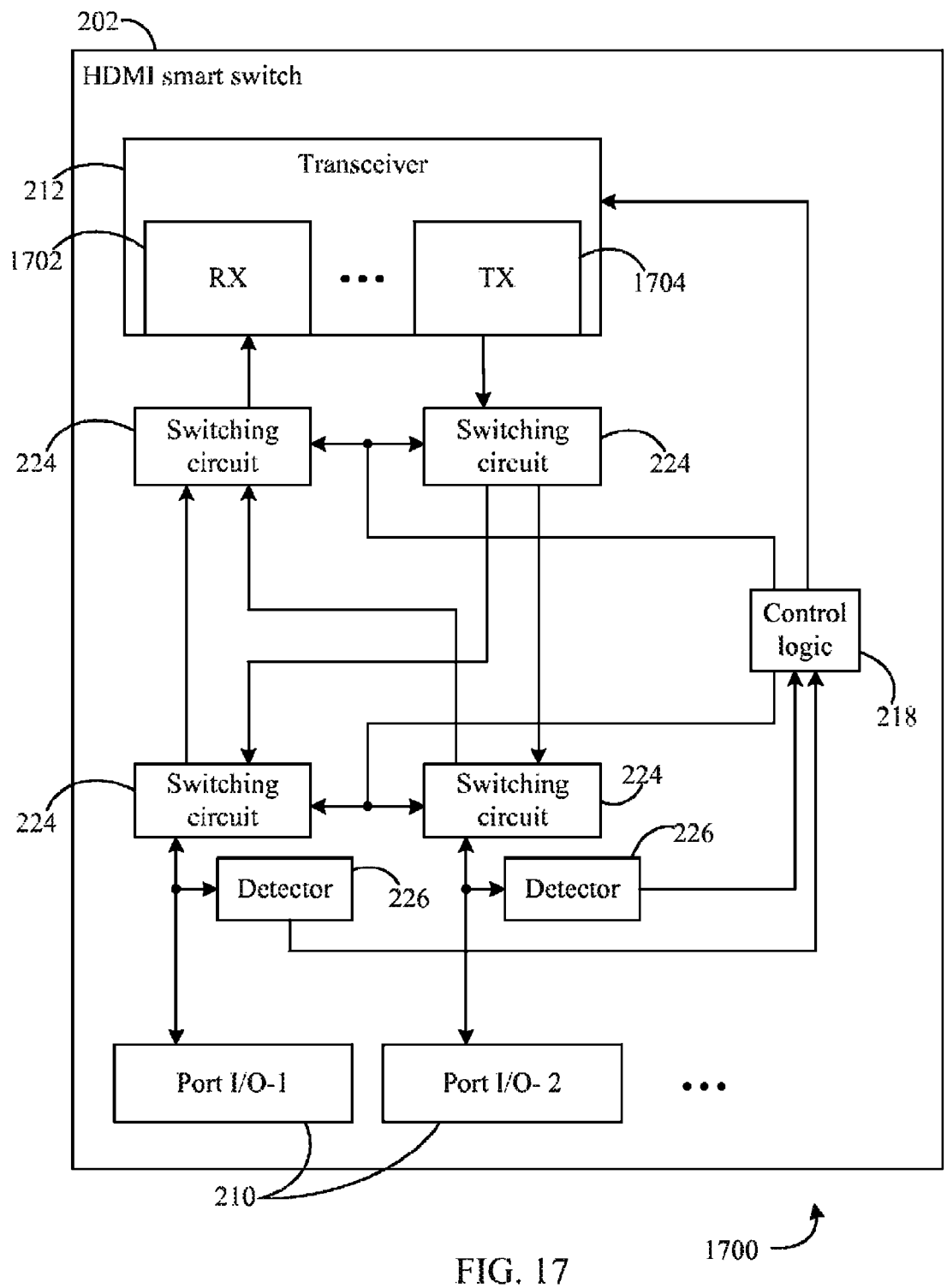
FIG. 17 is a block diagram of a portion of an HDMI smart switch configuration, according to an exemplary embodiment.

In embodiments, an HDMI switch, e.g., smart switch 202, with HDMI ports 210 may be connected to an HDMI enabled device. The switch may be configured, according to embodiments, to automatically detect if the HDMI enabled device that is connected is operating as a source device or a sink device (i.e., which type of device is connected), and to dynamically configure the connector or port accordingly. FIG. 17 provides such an example embodiment.

FIG. 17 is a block diagram of a detection and control configuration scheme 1700 for mapping of electronic devices to ports on an HDMI switch, according to embodiments. In embodiments, detection and control configuration scheme 1700 may be a further embodiment of smart switch 202. For instance, detection and control configuration scheme 400, as shown, includes smart switch 202, ports 210, transceiver 212, switching circuit 224, detectors 226, and control logic 218, as described above. Switching circuit 224, detectors 226, and ports 210 are shown as multiple portions in detection and control configuration scheme 1700 for illustrative clarity and ease of explanation. Only two ports of ports 210 have been shown to reduce illustrative complexity, however, additional ports 210 are contemplated in embodiments as described elsewhere herein. Transceiver 212 is shows as including a receiver portion 1702 and a transmitter portion 1704. In embodiments, multiple instances of receiver portion 1702 and transmitter portion 1704 are contemplated, as would be understood by a person of skill in the relevant art(s) having the benefit of this disclosure. For example, a transceiver 212 with three or four receiver portions 1702 is contemplated in embodiments, as is a transceiver 212 with two or more transmitter portions 1704.

Detectors 226 are configured to detect whether an electronic device connected to one of ports 210 is an HDMI source or sink. Indicia of the detection are provided to control logic 218 which in turn controls switching circuit(s) 224. For instance, if a sink is detected on one of ports 210 by detectors 226, switching circuit(s) 224 may be configured by control logic 218 via commands or control signals to provide a path or connection between the port and the transmitter portion 1704 of transceiver 212. In this way, transceiver 212 provides signal outputs to a sink device. Likewise, if a source is detected on one of ports 210 by detectors 226, switching circuit(s) 224 may be configured by control logic 218 to provide a path or connection between the port and the receiver portion 1702 of transceiver 212. In this way, transceiver 212 receives signal inputs from a source device.

Control logic 218 is also configured to provide commands or control signals to transceiver 212 or switching circuitry associated therewith. Based on commands or control signals from control logic 218, transceiver 212 (or switching circuitry associated therewith) is configured to provide signals from a source device, received on any receiver portion 1702, to a sink connected to any transmitter portion 1704. Essentially, a user may provide commands via control logic 218 to consume audio/video content from any source device (e.g., source devices 204) using any sink device (e.g., sink devices 206) by configuring switch 202 accordingly.

That is, automatic HDMI port mapping to connected devices of an HDMI switch is provided by way of the embodiments and techniques herein. Further details are found in U.S. patent application Ser. No. 14/945,079, entitled "AUTO DETECTION AND ADAPTIVE CONFIGURATION OF HDMI PORTS," the entirety of which is incorporated by reference herein, and in U.S. patent application Ser. No. 14/945,175, entitled "SEAMLESS SETUP AND CONTROL FOR HOME ENTERTAINMENT DEVICES AND CONTENT," the entirety of which is incorporated by reference herein.

Port mapping may also be accomplished by identification of input audio segments. In cases where devices for which HDMI (e.g., SPD, EDID, and/or CEC) and/or video identification techniques may fail, audio from the source device could be used for identification and mapping. Audio could be sampled at boot up or when the device enters into home screen, in embodiments.

Port mapping may also be accomplished by accepting voice input from user in cases where the automatic detection of the device fails. A voice input can be taken from the user which can then be mapped to the device. In embodiments, voice recognition circuits, software (e.g., services and/or applications), and/or the like may be included to perform voice recognition. User voice inputs may be stored in signature DB 526 or in storage(s) 222 of switch 202 in embodiments, or in a cloud storage (not shown) accessible by switch 202.

Port mapping may also be accomplished by explicit device selection by user. As an alternative to the voice input noted above, a user is provided a list of devices on the screen from which the user can select using a remote device.

C. Example Port Switching Embodiments

In embodiments, auto HDMI port switching of the devices connected to the switch may be performed.

Once the device is detected and mapped, the described embodiments automatically configure the HDMI switch to the right HDMI port—that is, to the port to which the source device that the user wants to watch is connected. The user only has to express intent to switch to a device (by any of the below means) and the switch automatically switches to that port using its previously learned port mapping.

The options by which the user could express his intent could be, without limitation, by: device name (voice input or via display), device remote control, service or application, channel, port number, and/or content. These techniques will now be described in further detail.

Port switching may be performed by device name, e.g., via voice input or via display. If a user knows the devices that are connected to the switch, using a smart app as described herein, the user is enabled to call out the device name or select the device by name from the display. For example, in a case of three connected devices, a user can express an intent to watch content from a first device (e.g., a STB) by just selecting it on the smart app or saying "set top box," and the smart switch would change to the corresponding HDMI port.

Port switching may be performed by device remote control. The smart HDMI switch device also recognizes the usage of the actual remote control of the source devices and may be configured to automatically switch to the correct HDMI port. As discussed in embodiments, electronic (e.g., CE) devices are mapped to HDMI ports on a smart switch. By intercepting various remote control commands and deciphering which device the commands are for, a smart switch according to embodiments is configured to change to the appropriate HDMI port for the electronic device associated with the remote control commands. In embodiments, smart switches, e.g., switch 202, are configured to intercept the various remote commands across transmissions over IR, Bluetooth®, Wi-Fi, ZigBee® RF4CE, IP, etc.

Port switching may be performed by content. In another case when the user is not specific about the device from which he wants to watch but more particular on what he wants to watch, such a content can be searched and selected. The smart switch is configured to automatically change port to the device that would stream this content.

For instance, consider the scenario discussed above in which a user desires to watch a particular movie, although other forms of multimedia content are also contemplated. According to embodiments, the user searches for the title or content of the movie, and selects the movie from the search results. The user is then presented with an option to play the movie from one or more sources (e.g., a STB, Netflix®, Hulu®, iTunes®, etc. The user may select, for example, the source Netflix®, prompting the movie to be played from Netflix® via Roku® (i.e., via the appropriate connector/port of the switch) on the TV of the user. Thus, according to embodiments, the user selects a movie for viewing without being required to identify or map the device on which the user will watch the movie Port switching may be performed by service or application. A smart switch, according to embodiments, is aware of the electronic devices connected thereto, and their capabilities, which include the services and application available on/via the connected devices. When a user searches for and selects a service or application, a smart switch according to the described embodiments switches its HDMI port to that device. For example, if AppleTV® is connected, the smart switch is aware that iTunes® (a related service/application) is available therewith. So when the user requests for iTunes®, the smart switch is configured to switch to the HDMI port to which AppleTV® is connected.

Port switching may be performed by channel name. In the case where a STB is connected, a smart switch, according to embodiments, is aware of the channels subscribed by user on his STB. A user is enabled to say the channel name (e.g., user says "HBO" or "Channel 7"), and the smart switch is configured to change its HDMI port to where the STB is connected.

Port switching may also be performed by HDMI port number. For instance, a user is able to also explicitly call out an HDMI port (i.e., the user says "2"), and the smart switch is configured to switch to that port.

Further details for port switching are found in U.S. patent application Ser. No. 14/945,175, entitled "SEAMLESS SETUP AND CONTROL FOR HOME ENTERTAINMENT DEVICES AND CONTENT," the entirety of which is incorporated by reference herein.

IV. Example Integration Embodiments

As an extension, any or all the above-described embodiments and techniques can be integrated into an HDMI sink device (e.g., TV, high-definition TV (HDTV), projector, and/or the like) thereby eliminating the HDMI switch or HDMI repeater (e.g., an AVR) as an additional device between HDMI sources and HDMI sinks.

V. Example Operational Embodiments

Figure 18A:
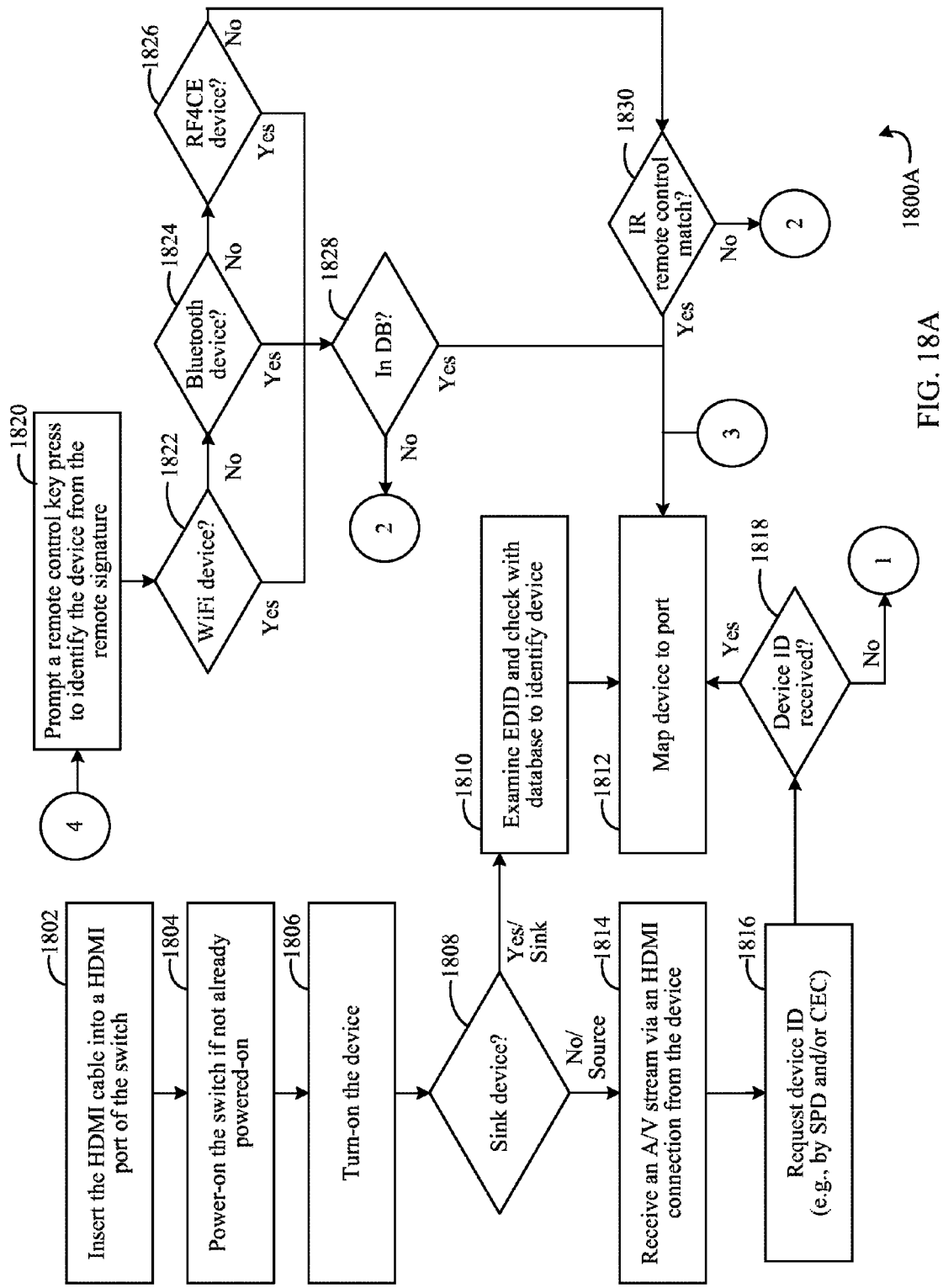
FIGS. 18A-18B are a flowchart of a method for setup and automatic identification and mapping of consumer electronic devices to ports on an HDMI switch, according to an exemplary embodiment.
Figure 18B:
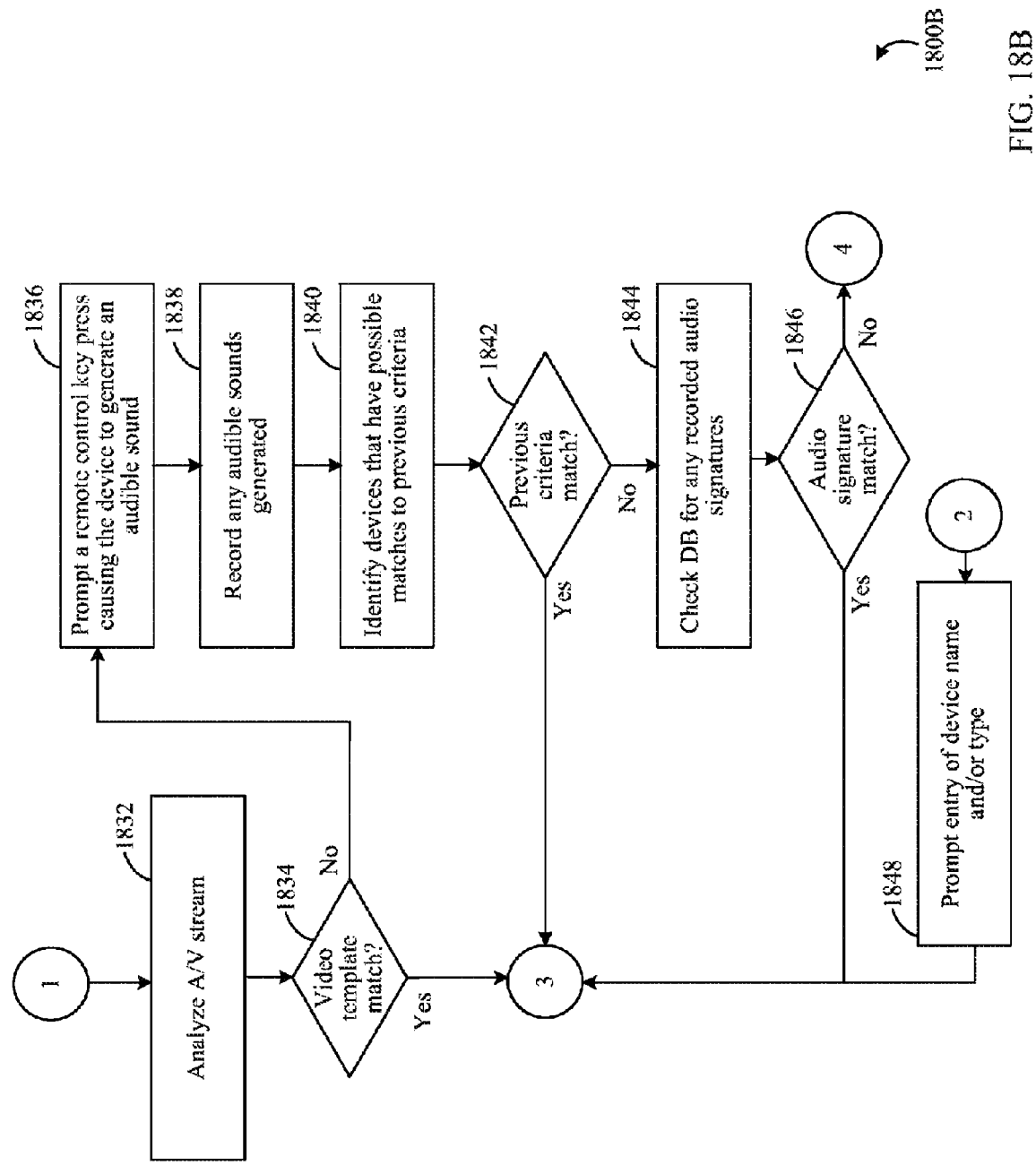

FIGS. 18A-18B show an exemplary flowchart 1800 comprised of parts 1800A and 1800B. Flowchart 1800 depicts an example method for setup, automatic identification, and mapping of consumer electronic devices to ports on an HDMI switch. One or more embodiments described herein may perform their functions according to flowchart 1800. Other structural and operational embodiments will be apparent to persons skilled in the relevant art(s) based on the discussion regarding flowchart 1800. Flowchart 1800 is described as follows.

Flowchart 1800 begins with step 1802. In step 1802, the HDMI cable is inserted into a HDMI port of the switch. In embodiments, the switch may be an HDMI smart switch (e.g., smart switch 202) as described herein, and the port may an I/O port that may be configured to be an input or an output according to embodiments. The cable may be previously connected to an electronic device or device as described herein.

In step 1804, the switch is powered on if it not already powered-on. In embodiments, the switch may be a smart switch as described herein and as exemplarily illustrated in FIGS. 2, 7A-7C, and 17.

In step 1806, the device is powered on using the power button on the remote or on the device itself. In embodiments, the device may be an HDMI sink device and/or an HDMI source device.

In step 1808, it is determined if the device is a sink device. For example, the smart switch may perform this determination in accordance with the embodiments described herein, such as auto-detection. If the device is an HDMI sink, the flow proceeds to step 1810, otherwise to step 1814.

In step 1810, Extended Display Identification Data (EDID) is examined and a database is checked to identify the device. The EDID may be provided as data from the HDMI sink device upon connection to the smart switch and/or upon power up of the HDMI sink device if already connected to the smart switch. The EDID may include a device identification or ID of the HDMI sink device and the device ID may be used to check the database to identify the device by matching the ID to an entry in the database.

In step 1812, the device is mapped to a port. For example, based on the checked ID of step 1810, the smart switch may dynamically map the device to a port of the smart switch and dynamically configure the port as described in embodiments herein.

In step 1814, an audio/video (AN) stream is received via an HDMI connection from the device. Because the determination in step 1810 was that the device was not a sink device, the device may be identified as a source device. In embodiments, the device starts sending the AN stream over the HDMI connection to the smart switch (e.g., as shown in FIGS. 2 and 7A-7C).

In step 1816, a device ID is requested. A device ID may be requested in various ways according to embodiments. For example the smart switch, acting as a sink device, may determine if device information is available in an HDMI SPD information frame from which a device ID may be taken.

The smart switch may request the Vendor ID from the device, which will in turn provide its Vendor ID according to the CEC specification if the HDMI source supports consumer electronics control (CEC). According to the CEC specification, when a sink device queries a source for its CEC Vendor ID, the source has to respond to that request with its CEC Vendor ID. This then can be used to give a name to the device, and the port is mapped with that name. As noted, the smart switch acts as a sink to a source (see step 1814), and hence can initiate this query to identify the device.

In embodiments, the smart switch may first determine if the SPD information is available to provide a device ID before attempting to request a Vendor ID via CEC as described above.

In step 1818, it is determined if the device ID is present. For instance, if a device ID may be determined from available SPD information and/or the vendor ID is requested, as in step 1816, and returned, the smart switch may determine if the device ID is received and is present. If the device ID is present (e.g., via SPD information and/or the CEC Vendor ID), the flow proceeds to step 1812 described above, otherwise to step 1832 via connector 1 as shown in FIG. 18A.

In step 1820, a remote control key press is prompted to identify the device from the remote signature. For example, the smart switch may prompt a user to press a key on the remote control to see if the smart switch can identify the device from the remote signature. The remote signature may be received via wired or wireless connection, e.g., by remote controller component 406 of identification component 208, and identified by the smart switch.

In step 1822, it is determined if the device is a Wi-Fi device. For example, the smart switch may make this determination as described in step 1820. If a Wi-Fi device is detected, the device is thus identified, and the flow proceeds to step 1828, otherwise to step 1824.

In step 1824, it is determined if the device is a Bluetooth device. For example, the smart switch may make this determination as described in step 1820. If a Bluetooth device is detected, the device is thus identified, and the flow proceeds to step 1828, otherwise to step 1826.

In step 1826, it is determined if the device is an RF4CE device. For example, the smart switch may make this determination as described in step 1820. If an RF4CE device is detected, the device is thus identified, and the flow proceeds to step 1828, otherwise to step 1830.

In step 1828, the device detected (according to steps 1822, 1824, and/or 1826) is queried or mapped against known devices from a database. For example, one or more components of smart switch 202 described herein may determine if the device detected matches or corresponds to a device stored in a database (e.g., signature DB 526) of the smart switch. If a match or correspondence is determined, the flow proceeds to step 1812 described above, otherwise to step 1848 of flowchart 1800 shown in FIG. 18B via connector 2.

In step 1830, it is determined if there is an IR remote control match for the device. For example, the smart switch may make this determination as described in step 1820. For example, a database portion of remote control data may be stored in smart switch 202 (e.g., in signature DB 526) as described above. If a remote control match for the device is detected, the flow proceeds to step 1812 described above, otherwise to step 1848 of flowchart 1800 shown in FIG. 18B via connector 2.

In step 1832, the A/V stream is analyzed. For example, the smart switch may begin analyzing the A/V stream from the device to identify logos, text, images, audio segments, etc., of source devices that correspond to device signatures in database of the smart switch as described above.

In step 1834, it is determined if there is a template match. For instance, the smart switch may determine if the analyzed A/V stream includes characteristics that match a signature in signature DB 526. If it is determined that a match exists, the device is thus identified, and the flow proceeds to step 1812 of flowchart 1800 shown in FIG. 18A via connector 3. Otherwise, the flow proceeds to step 1836.

In step 1836, a remote control key press is prompted to cause the device to generate an audible sound. For example, the smart switch may prompt a user to click a button (e.g., a home button) on the remote control to generate a sound.

In step 1838, any audible sounds generated are recorded. In embodiments, the smart switch may record the sounds for comparison to stored audio signatures in a database.

In step 1840, devices that have possible matches to previous criteria are identified. This may narrow the database search for matching devices by eliminating devices that would have otherwise matched one of the above described criteria.

In step 1842, it is determined if any of the signatures/templates match with a logo, keywords, or screen images. In embodiments, the smart switch may make this determination as described herein. If a match is determined, the flow proceeds to step 1812 of flowchart 1800 shown in FIG. 18A via connector 3. Otherwise, the flow proceeds to step 1844.

In step 1844, a database is checked for recorded audio signatures. In embodiments, if any audio signatures are stored in the database (e.g., a database in a storage of the smart switch as shown in FIG. 8), the smart switch may check to determine if a match between the recorded audio signatures match a stored audio signature to determine the identity of the device.

In step 1846, it is determined if there is an audio signature match. If a match is determined by the smart switch, the flow proceeds to step 1812 of flowchart 1800 shown in FIG. 18A via connector 3. Otherwise, the flow proceeds to step 1820 of flowchart 1800 shown in FIG. 18A via connector 4.

In step 1848, an entry of the device name and/or type may be prompted. If the match determination of step 1846 is negative, the device may be a proprietary and/or unknown device. In such cases, the smart switch may prompt the user to enter the device name and/or device type, as well as other information regarding the device, to be stored in a database of the smart switch. The user may enter such information via a remote control or other computing device described herein. If sufficient information is received from the user, the flow may proceed to step 1812 of flowchart 1800 shown in FIG. 18A via connector 3.

VI. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The automatic identification and mapping of consumer electronic devices to ports on an HDMI switch embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 19:
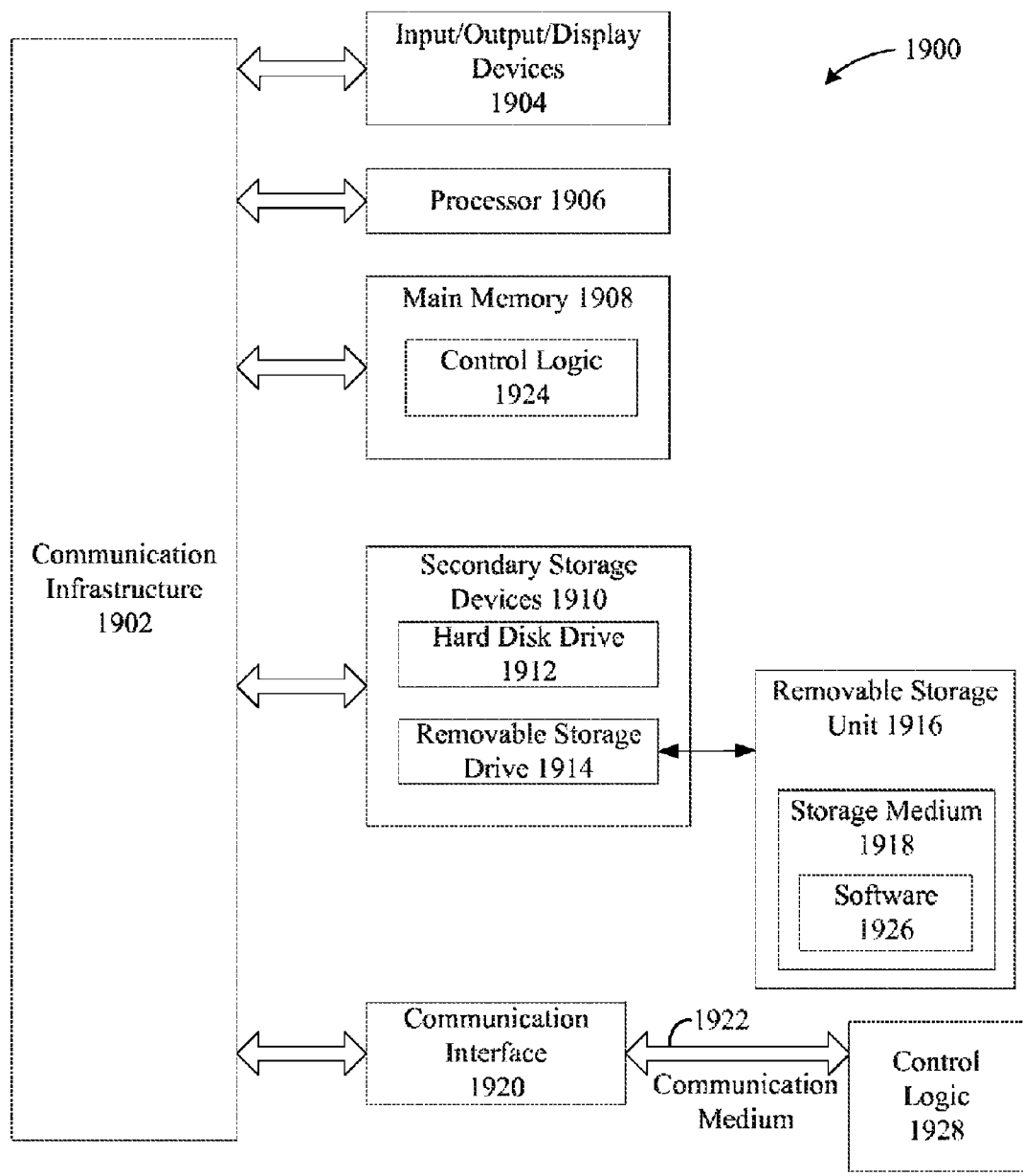
FIG. 19 is a block diagram of a computer system, according to an exemplary embodiment.

The embodiments described herein, including systems, methods/processes, devices, and/or apparatuses, may be implemented using well known processing devices, telephones (smart phones and/or mobile phones), tablet computers, servers, and/or, computers, such as a computer 1900 shown in FIG. 19. It should be noted that computer 1900 may represent communication devices, processing devices, servers, and/or traditional computers in one or more embodiments. For example, the automatic identification and mapping of consumer electronic devices to ports on an HDMI switch embodiments, and any of the sub-systems or components respectively contained therein, may be implemented using one or more computers 1900 or portions thereof.

Computer 1900 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1900 may be any type of computer, including a desktop computer, a server, etc.

Computer 1900 includes one or more processors (also called central processing units, or CPUs), such as a processor 1906. Processor 1906 is connected to a communication infrastructure 1902, such as a communication bus. In some embodiments, processor 1906 can simultaneously operate multiple computing threads.

Computer 1900 also includes a primary or main memory 1908, such as random access memory (RAM). Main memory 1908 has stored therein control logic 1924 (computer software), and data.

Computer 1900 also includes one or more secondary storage devices 1910. Secondary storage devices 1910 include, for example, a hard disk drive 1912 and/or a removable storage device or drive 1914, as well as other types of storage devices, such as memory cards and memory sticks. For instance, computer 1900 may include an industry standard interface, such a universal serial bus (USB) interface for interfacing with devices such as a memory stick. Removable storage drive 1914 represents a floppy disk drive, a magnetic tape drive, a compact disk drive, an optical storage device, tape backup, etc.

Removable storage drive 1914 interacts with a removable storage unit 1916. Removable storage unit 1916 includes a computer useable or readable storage medium 1918 having stored therein computer software 1926 (control logic) and/or data. Removable storage unit 1916 represents a floppy disk, magnetic tape, compact disk, DVD, optical storage disk, or any other computer data storage device. Removable storage drive 1914 reads from and/or writes to removable storage unit 1916 in a well-known manner.

Computer 1900 also includes input/output/display devices 1904, such as touchscreens, LED and LCD displays, monitors, keyboards, pointing devices, etc.

Computer 1900 further includes a communication or network interface 1918. Communication interface 1920 enables computer 1900 to communicate with remote devices. For example, communication interface 1920 allows computer 1900 to communicate over communication networks or mediums 1922 (representing a form of a computer useable or readable medium), such as LANs, WANs, the Internet, etc. Network interface 1920 may interface with remote sites or networks via wired or wireless connections.

Control logic 1928 may be transmitted to and from computer 1900 via the communication medium 1922.

Any apparatus or manufacture comprising a computer useable or readable medium having control logic (software) stored therein is referred to herein as a computer program product or program storage device. This includes, but is not limited to, computer 1900, main memory 1908, secondary storage devices 1910, and removable storage unit 1916. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 19) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. §101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1906 of FIG. 19), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method for automatic identification and mapping of an electronic device to a port on a high-definition media interface (HDMI) switch, the method comprising:
   receiving a signal from the electronic device at a port of the HDMI switch;
   determining whether the electronic device is an HDMI sink or an HDMI source based at least in part on the received signal;
   in response to determining that the electronic device is an HDMI sink:
      identifying the electronic device based on identification data in the signal, and
      mapping the electronic device to the port and setting the port as an output port of the HDMI switch based on the identifying the electronic device based on the identification data; and
   in response to determining that the electronic device is an HDMI source:
      receiving an audio/video stream from the electronic device,
      identifying the electronic device based on data in the audio/video stream, and
      mapping the electronic device to the port and setting the port as an input port of the HDMI switch based on the identifying the electronic device based on data in the audio/video stream.

2. The method of claim 1, wherein identifying the electronic device based on data in the audio/video stream comprises:
   receiving an HDMI consumer electronics control (CEC) command response from the electronic device; and
   determining an identifier of the electronic device based on data in the HDMI CEC command response.

3. The method of claim 1, wherein identifying the electronic device based on data in the audio/video stream comprises:
   prompting, by the HDMI switch, a remote control key press;
   determining, based on an action performed by the remote control, at least one of:
      a device type of the electronic device as being at least one of a Wi-Fi device, a Bluetooth device, or a Radio Frequency for Consumer Electronics (RF4CE) device based on a remote control signature; or
      an infrared (IR) command of the remote control; and
   identifying the electronic device in a database based on at least one of the device type, the remote control signature, or the IR command.

4. The method of claim 1, wherein identifying the electronic device based on data in the audio/video stream comprises:
   analyzing the received audio/video stream for at least one signature;
   comparing the at least one signature against one or more templates stored in a database; and
   identifying the electronic device in the database based on the comparing.

5. The method of claim 4, wherein the signature is a video signature that includes at least one of a logo, text, an image, blocks of text, or blocks of images.

6. The method of claim 4, wherein the signature is an audio signature; and
   wherein analyzing the received audio/video stream comprises:
      prompting, by the HDMI switch, a remote control key press to generate the audio signature; and
      recording the at least one audio signature.

7. The method of claim 1, further comprising:
   prompting, by the HDMI switch, a user data entry for a name of the electronic device and/or a designation of the electronic device as an HDMI source or an HDMI sink.

8. A computer-readable storage device having executable program instructions recorded thereon that, when executed by a processor of a processing device, cause the processing device to perform a method for automatic identification and mapping of an electronic device to a port on a high-definition media interface (HDMI) switch, the method comprising:
   receiving a signal from the electronic device at a port of the HDMI switch;
   determining whether the electronic device is an HDMI sink or an HDMI source based at least in part on the received signal;
   in response to determining the electronic device is an HDMI sink:
      identifying the electronic device based on identification data in the signal, and
      mapping the electronic device to the port and setting the port as an output port of the HDMI switch based on the identifying the electronic device based on the identification data; and
   in response to determining that the electronic device is an HDMI source:
      receiving an audio/video stream from the electronic device,
      identifying the electronic device based on data in the audio/video stream, and
      mapping the electronic device to the port and setting the port as an input port of the HDMI switch based on the identifying the electronic device based on data in the audio/video stream.

9. The computer-readable storage device of claim 8, wherein identifying the electronic device based on data in the audio/video stream comprises:
   receiving an HDMI consumer electronics control (CEC) command response from the electronic device; and
   determining an identifier of the electronic device based on data in the HDMI CEC command response.

10. The computer-readable storage device of claim 8, wherein identifying the electronic device based on data in the audio/video stream comprises:
    prompting, by the HDMI switch, a remote control key press;
    determining, based on an action performed by the remote control, at least one of:
       a device type of the electronic device as being at least one of a Wi-Fi device, a Bluetooth device, or a Radio Frequency for Consumer Electronics (RF4CE) device based on a remote control signature; or
       an infrared (IR) command of the remote control; and
    identifying the electronic device in a database based on at least one of the device type, the remote control signature, or the IR command.

11. The computer-readable storage device of claim 8, wherein identifying the electronic device based on data in the audio/video stream comprises:

analyzing the received audio/video stream for at least one signature;

comparing the at least one signature against one or more templates stored in a database; and identifying the electronic device in the database based on the comparing.

12. The computer-readable storage device of claim 11, wherein the signature is a video signature that includes at least one of a logo, text, an image, blocks of text, or blocks of images.

13. The computer-readable storage device of claim 11, wherein the signature is an audio signature; and wherein analyzing the received audio/video stream comprises:

prompting, by the HDMI switch, a remote control key press to generate the audio signature; and recording the at least one audio signature.

14. The computer-readable storage device of claim 8, wherein the method further comprises:

prompting, by the HDMI switch, a user data entry for a name of the electronic device and/or a designation of the electronic device as an HDMI source or an HDMI sink.

\* \* \* \* \*